(12) United States Patent
Kondou et al.

(10) Patent No.: US 7,024,095 B1
(45) Date of Patent: Apr. 4, 2006

(54) EDITING APPARATUS AND METHOD FOR EXTRACTING SPECIFIED PORTIONS OF EDITING MATERIAL

(75) Inventors: Toshiharu Kondou, Kanagawa (JP); Noboru Yanagita, Kanagawa (JP); Tadashi Fujiwara, Kanagawa (JP); Masayuki Iwamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/601,151

(22) PCT Filed: Nov. 30, 1999

(86) PCT No.: PCT/JP99/06706

§ 371 (c)(1),
(2), (4) Date: Jul. 27, 2000

(87) PCT Pub. No.: WO00/33311

PCT Pub. Date: Jun. 8, 2000

(30) Foreign Application Priority Data

Nov. 30, 1998 (JP) .................................. 10-340787

(51) Int. Cl.
*H04N 5/76* (2006.01)
(52) U.S. Cl. .......................................... 386/52; 386/55
(58) Field of Classification Search .................... 386/4, 386/52, 55, 60–62, 64; 369/83–85; 360/13, 360/15–17; 345/723–726
See application file for complete search history.

(56) References Cited

U.S. PATENT DOCUMENTS

| | | | |
|---|---|---|---|
| 5,339,393 A | | 8/1994 | Duffy et al. |
| 6,011,898 A | | 1/2000 | Iwasaki et al. |
| 6,321,024 B1 | * | 11/2001 | Fujita et al. ................. 386/55 |
| 6,438,313 B1 | * | 8/2002 | Ohmori et al. .............. 386/55 |
| 6,477,315 B1 | * | 11/2002 | Ohomori ...................... 386/55 |
| 6,564,002 B1 | * | 5/2003 | Murakami et al. ........... 386/52 |
| 6,661,965 B1 | * | 12/2003 | Yamamoto ................... 386/52 |
| 6,674,955 B1 | * | 1/2004 | Matsui et al. ................ 386/52 |
| 6,795,638 B1 | * | 9/2004 | Skelley, Jr. ................... 386/52 |

FOREIGN PATENT DOCUMENTS

| | | |
|---|---|---|
| GB | 2 296 601 | 7/1996 |
| JP | 6-348799 | 12/1994 |
| JP | 8-279275 | 10/1996 |
| JP | 9-63249 | 3/1997 |
| WO | WO 96/05696 | 2/1996 |
| WO | WO98/36566 | * 8/1998 |

* cited by examiner

*Primary Examiner*—Thai Tran
(74) *Attorney, Agent, or Firm*—Frommer Lawrence & Haug LLP; William S. Frommer; Thomas F. Presson

(57) ABSTRACT

In an editing apparatus and an editing method where the editing operation is enhanced in easiness and accuracy, a marker RSM or GSM is detected by a fast access to a tape-shaped recording medium 1, material data read out according to the detection of the marker from the tape-shaped recording medium are registered onto a given file 125, then material data registered on the file 125 are displayed and an edit list of material data is made out using the displayed material data, so that the operation of making out an edit list can be simplified without making an access to material data of the tape-shaped recording medium 1.

6 Claims, 19 Drawing Sheets

EDITING APPARATUS AND METHOD FOR EXTRACTING SPECIFIED PORTIONS OF EDITING MATERIAL

TECHNICAL FIELD

The present invention relates to an editing apparatus and an editing method, and is suitable for the application to an editing apparatus and an editing method for extracting the needed portions of an editing material to make an edit.

BACKGROUND ART

Conventionally, material data obtained from the material images photographed by a cameraman with the aid of a video camera or the like are recorded in a magnetic tape and edited by using an editing apparatus. In this case, while playing back the magnetic tape by use of the playback device of the editing apparatus, an editing operator visually confirms the material images recorded in the magnetic tape, extracts the portions needed for the editing operation and downloads them into another medium, thereby enabling the edited data composed only of the needed images and voices to be obtained.

Incidentally, with respect to the scene judged to be necessary for the later editing operation during the time of photographing material images with the aid of a video camera, a cameraman takes notes of the time code when the relevant scene is recorded on a magnetic tape.

In the editing operation, an editing operator loads the magnetic tape with material data recorded thereon onto a playback device, makes a scene search for the scene judged by him to be necessary based on the time code recorded by a cameraman and downloads it on another medium as the needed material after confirming the content of the relevant scene.

With a method for imparting the recording position of the scene judged by a cameraman to be necessary to an editing operators through a memorandum, however, there was a troublesome problem for the editing operator in operating a playback device to make a scene search for every scene designated with the time code.

DISCLOSURE OF INVENTION

In consideration of these points, the present invention intends to provide an editing apparatus and an editing method easier and more accurate in editing operation.

To solve these problems, the present invention detects a marker by making a fast access to a tape-shaped recording medium, registers the material data read out from the tape-shaped recording medium onto a given file according to the detection of the relevant marker in advance so as to display the material data registered on the relevant file and makes out an edit list of material data by using the displayed material data, thereby eliminating the need for an access to material data of the tape-shaped recording medium and simplifying the operation of making out an edit list.

Besides, if a marker is detected by the fast access in detecting a marker recorded on a tape-shaped recording medium by making a fast access thereto, the present invention gets the material data near the marker recording position into given storage means by reading out material data therefrom according to the detection of the marker, then makes an access thereto at a lower speed than the access speed of the fast access, reads the material data at the position coincident with the recording position of the marker and replaces them with the approximate material data incorporated by the storage means so that the approximate material data incorporated by fast access can be replaced with the material data accurately conforming to the marker, thereby enabling an editing operation using accurate material data to be performed.

Besides, the present invention detects markers by making a fast access to a tape-shaped recording medium to register them onto a given file in advance and makes out an edit list of material data on the basis of the markers registered on the relevant file, thereby eliminating the need for an access to material data on the tape-shaped tape medium in the operation of making out an edit list. Thus, the operation of making out an edit list is simplified.

Furthermore, on detecting a marker during the fast playback of a tape-shaped recording medium, the present invention stores the time code according to the detected marker and holds the material data in the course of playback therefrom as well to register the held material data and time code onto the file. Thereby, the material data and the time code on the file become mutually coincident concerning the marker, so that the operation of making out an edit list can be accurately performed.

BRIEF DESCRIPTION OF DRAWINGS

FIG. 12 is a schematic diagram showing a dialog box for setting markers to be searched for;

BEST MODE FOR CARRYING OUT THE INVENTION

Figure 1:
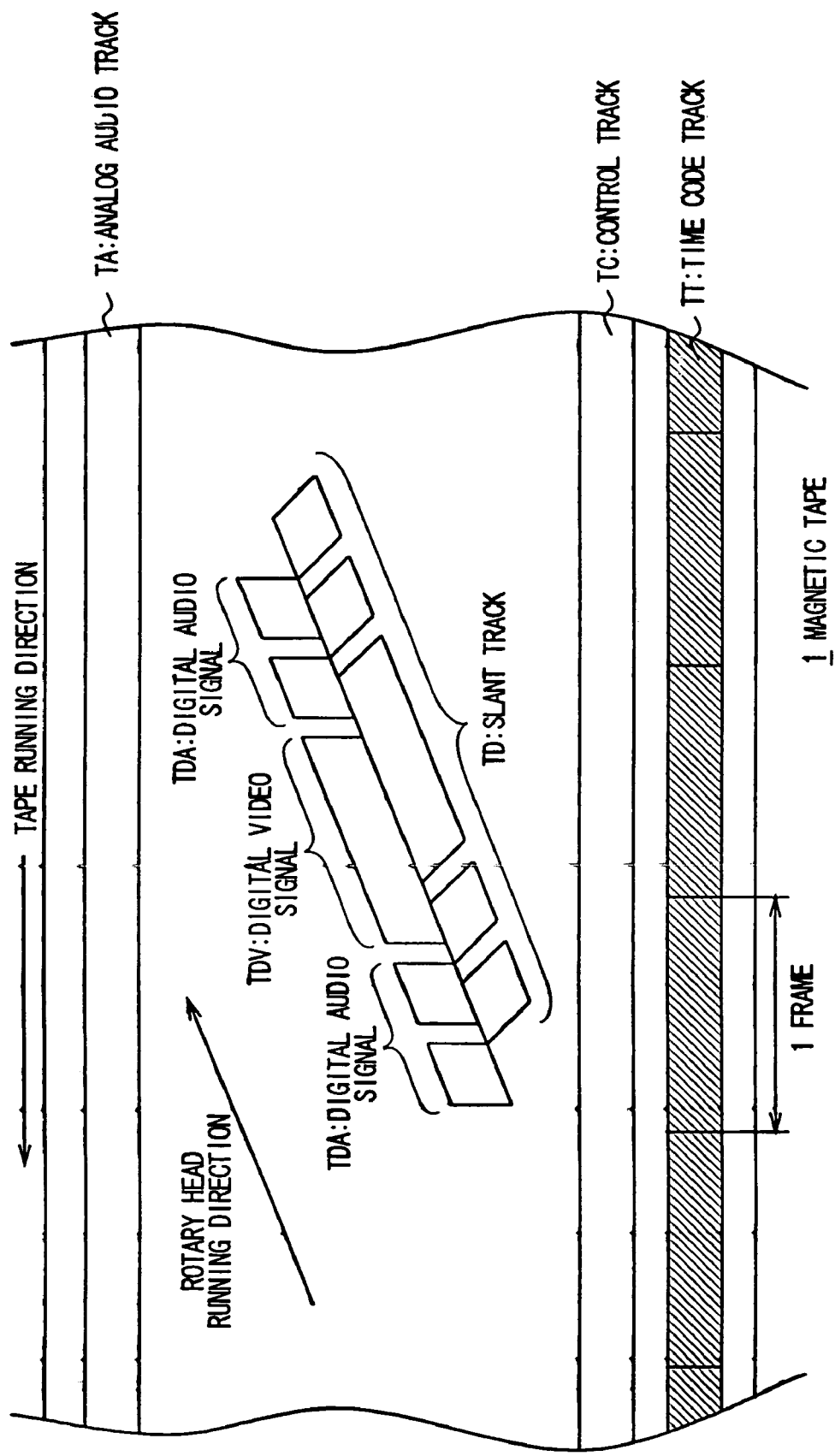
FIG. 1 is a schematic diagram showing the recording pattern of a magnetic tape.

Hereinafter, referring to the drawings, one embodiment of the present invention will be described.

(1) Tape Format

FIG. 1 shows the recording pattern of a magnetic tape 1 comprising the recording of material images photographed with the aid of a video camera and a slant track TD with digital video signals and audio signals recorded thereon by means of a stationary head is created at the center of the magnetic tape 1. Incidentally, the slant track TD consists of a region TDV in which digital video signals are recorded and a region TDA in which digital audio signals are recorded. At one edge of the magnetic tape 1, an audio track (track in length) TA with analog audio signals recorded thereon by means of a rotary head is created. At another edge of the magnetic tape 1, a control track (track in length) TC with control signals recorded thereon by means of a stationary head is created and further a time code track (track in length) TT with time code signals recorded by means of the stationary head thereon is created at a position adjacent to the control track.

Figure 2:
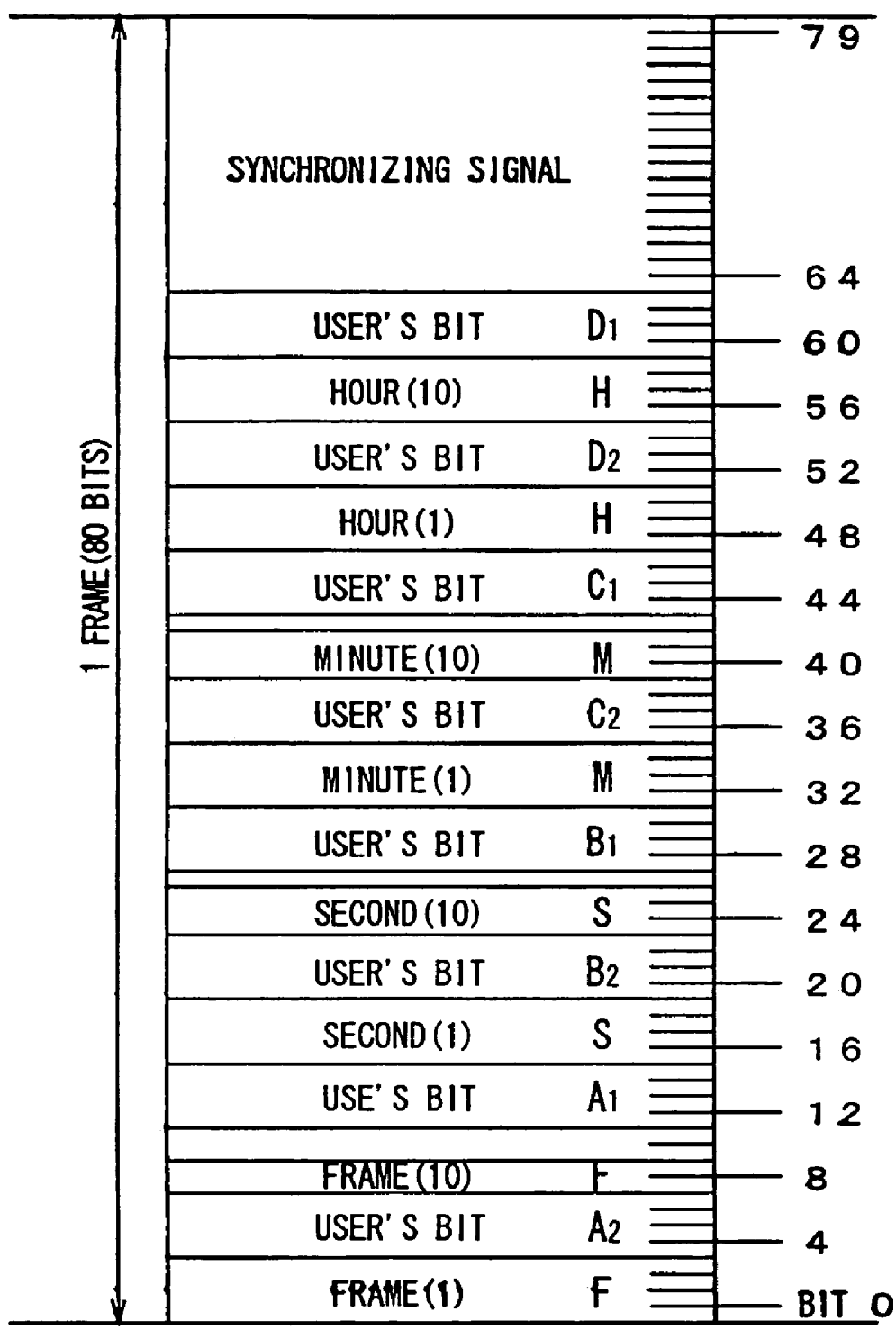
FIG. 2 is a schematic diagram showing the format of a time code signal.

As shown in FIG. 2, the time code signals (LTC) recorded on the above time code track TT are constructed with one frame area composed of 80 bits taken as one unit. This one frame area comprises a synchronizing signal area for recording a synchronizing signal, 8 time code record bit areas for recording time codes (HH:MM:SS:FF) and 8 user's bit record areas for recording user's bits (D1D2:C1C2:B1B2: A1A2).

Specifically, the "Hour" information of a time code is recorded in two bit areas (H, H), expressed in bits 48–51 and bits 56–59, the "Minute" information thereof is recorded in two bit areas (M, M), expressed in bits 32–35 and bits 40–42, the "Second" information thereof is recorded in two bit areas (S, S), expressed in bits 16–19 and bits 24–26 and the "Frame" information thereof is recorded in two bit areas (F, F), expressed in bits 0–3 and bits 8–9.

Besides, in 8 user's bit record areas, start codes, mark identification codes, data serial number codes and check sum codes are so arranged as to be recorded. Start codes are recorded in two bit areas (D1, D2), expressed in bits 60–63 and bits 52–55, mark identification codes are recorded in two bit areas (C1, C2), expressed in bits 44–47 and bits 36–39, data serial number codes are recorded in two bit areas (B1, B2), expressed in bits 28–31 and bits 20–23 and check sum codes are, recorded in two bit areas (A1, A2), expressed in bits 12–15 and bits 4–7.

The start codes are codes indicating the start of time code information recorded areas and that of user's areas in one frame comprising 80 bits and always record the data of "OFFh."

The mark identification codes are codes indicating the types of mark data. If the "Rec start mark" is marked by a cameraman, "20*h*" is marked as mark identification data, "21*h*" is marked as mark identification data if the "shot mark 1" is marked by a cameraman and "22*h*" is recorded as mark identification data if the "shot mark 2" is marked by a cameraman. Besides, the "23*h*" is recorded as mark identification data if the "edit mark 1" is marked by an editing operator operating an editing apparatus and the "24*h*" is recorded as mark identification data if the "edit mark 1" is marked by an editing operator.

Incidentally, this mark identification code is recorded not only in one frame at the instant that a marking is specified by a cameraman or by an editing operator, but recorded continuously also for 20 frames from the instant that a marking is specified. For example, a case is assumed where the shot mark 1 is marked by a cameraman at the timing represented by a time code of "01:12:20:05." In this case, data of "21*h*" continues to be recorded on this time code track as mark identification code for 20 frames from a time code of "01:12:20:05" at the marked instant to a time code of "01:12:20:24."

The reason why the same mark identification code continues to be recorded for 20 frames is to permit this mark identification code to be securely read out in the editing apparatus mentioned below. When an attempt is made to play back an information item from this timing track, a read error might occur from a data defect of the tape, bit error or the like. In such a case, there is a possibility of no mark information item to be obtained from the tape if a mark identification code is written only at the part of this time code, "01:12:20:05." Besides, if the tape is run at high speed, a case where no data of the whole frame can be retrieved happens depending on the capability of a hardware such as CPU. Also in such a case, there is a possibility of no mark information item to be obtained from the tape, thereby disabling an important scene to be retrieved similarly, if a mark identification code is written only at the part of this time code, "01:12:20:05."

According to the format shown in FIG. 2, however, the same mark identification code is recorded for 20 frames from the timing marked and consequently, even if the mark identification code recorded in the first frame cannot be read out, the mark identification code can be retrieved securely by the playback of the frame subsequent to it. Besides, also in case of running a tape at so high speed as to allow no access to data of all frames on the time code track, it is only necessary to read out the mark identification code of at least one frame among the 20 frames, so that the mark identification code can be securely retrieved from the tape.

The data serial number code is data indicating the number of a frame from the head in a continuous 20 frames. In the above example, for example, "01" indicating the first frame is recorded as the data serial number of the frame at a time code of "01:12:20:05" and "20" indicating the 20th frame is recorded as the data serial number of the frame at a time code of "01:12:20:24."

The reason why a data serial number code is stored is to obtain the time code of the first frame, i.e., that of the marked time. From the data of 20 frames recorded on the time code track by the fast playback, for example, it is assumed that the data of the eighth frame could be read out by a fast tape run. The time code of the eighth frame read out is 01:12:20:12 and the data serial number code is "08." From these two sets of data, it is easily revealed that the first time code is "01:12:20:05."

(2) Total Configuration of an Editing Apparatus

Figure 3:
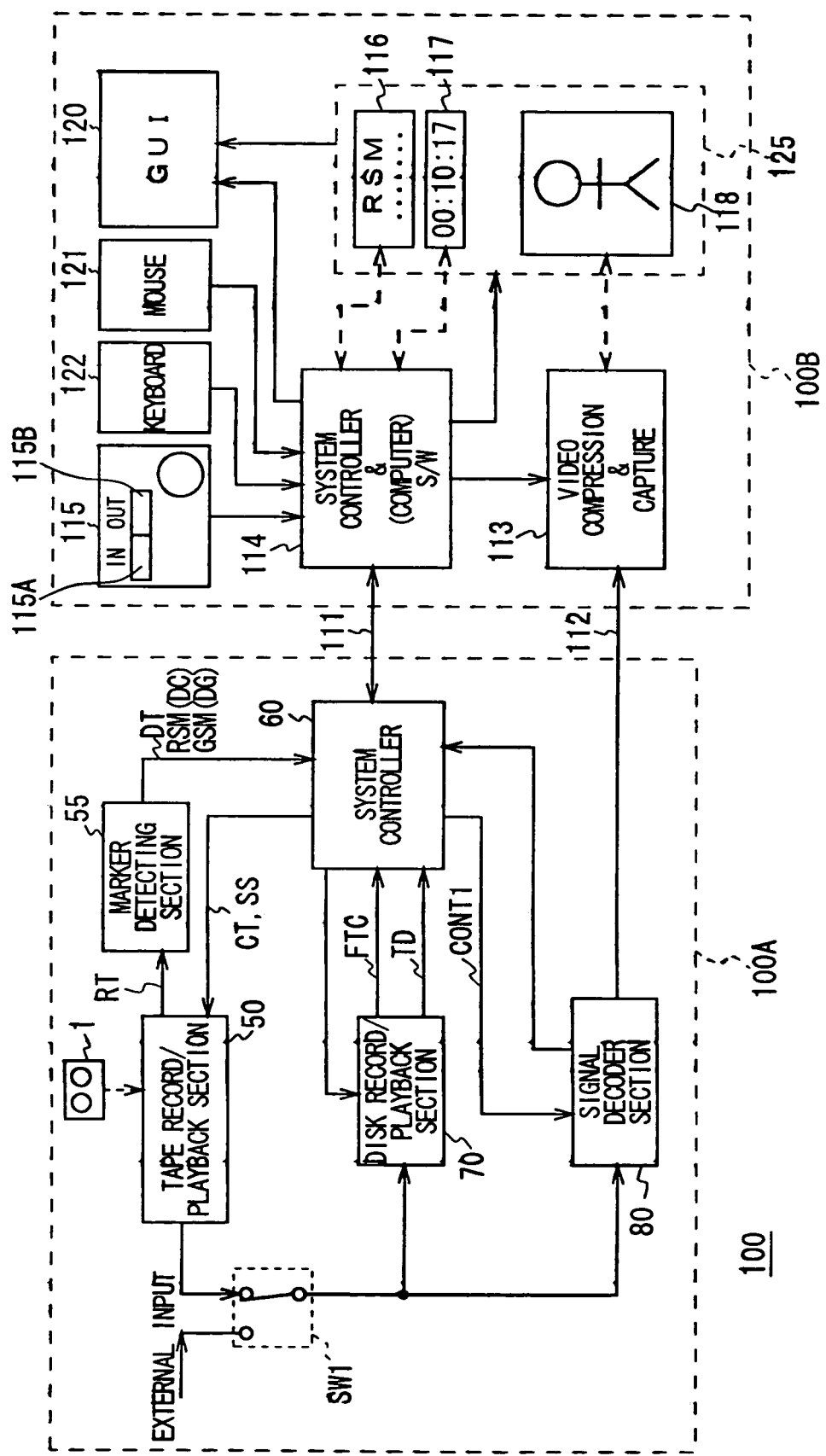
FIG. 3 is a block diagram showing the whole configuration of an editing apparatus according to the present invention.

In FIG. 3, reference numeral 100 denotes an editing apparatus, to which both a hybrid recorder 100A for the playback of a magnetic tape 1 with material data recorded thereon and a computer-organized editing controller 100B are connected through a controlling communication cable 111 for the RS-422 serial communication and a transmission cable 112 for the video/audio signal transmission.

The hybrid recorder 100A comprises a tape record/playback section 50 for recording or playing back material data onto or from a magnetic tape 1 and a disk record/playback section 70 for recording the material data played back from a magnetic tape 1 onto a hard disk and moreover for non-linearly editing the recorded material data on a disk file.

Referring to a control signal inputted via the controlling communication cable 111 from the editing controller 100B, the system controller 60 downloads a specific scene specified by a control signal or the whole to the disk record/playback section 70 out of the material data (video and audio data) recorded on the magnetic tape 1 loaded on the tape record/playback section 50. In this case, the tape record/playback section 50 makes a fast playback of material data from the magnetic tape 1 at quadruple speed and supplies the played back material data via the switch circuit SW1 to the disk record/playback section 70. In the disk record/playback section 70, recording the material data played back from the tape-record/playback section 50 implements a fast download at quadruple speed.

Figure 4:
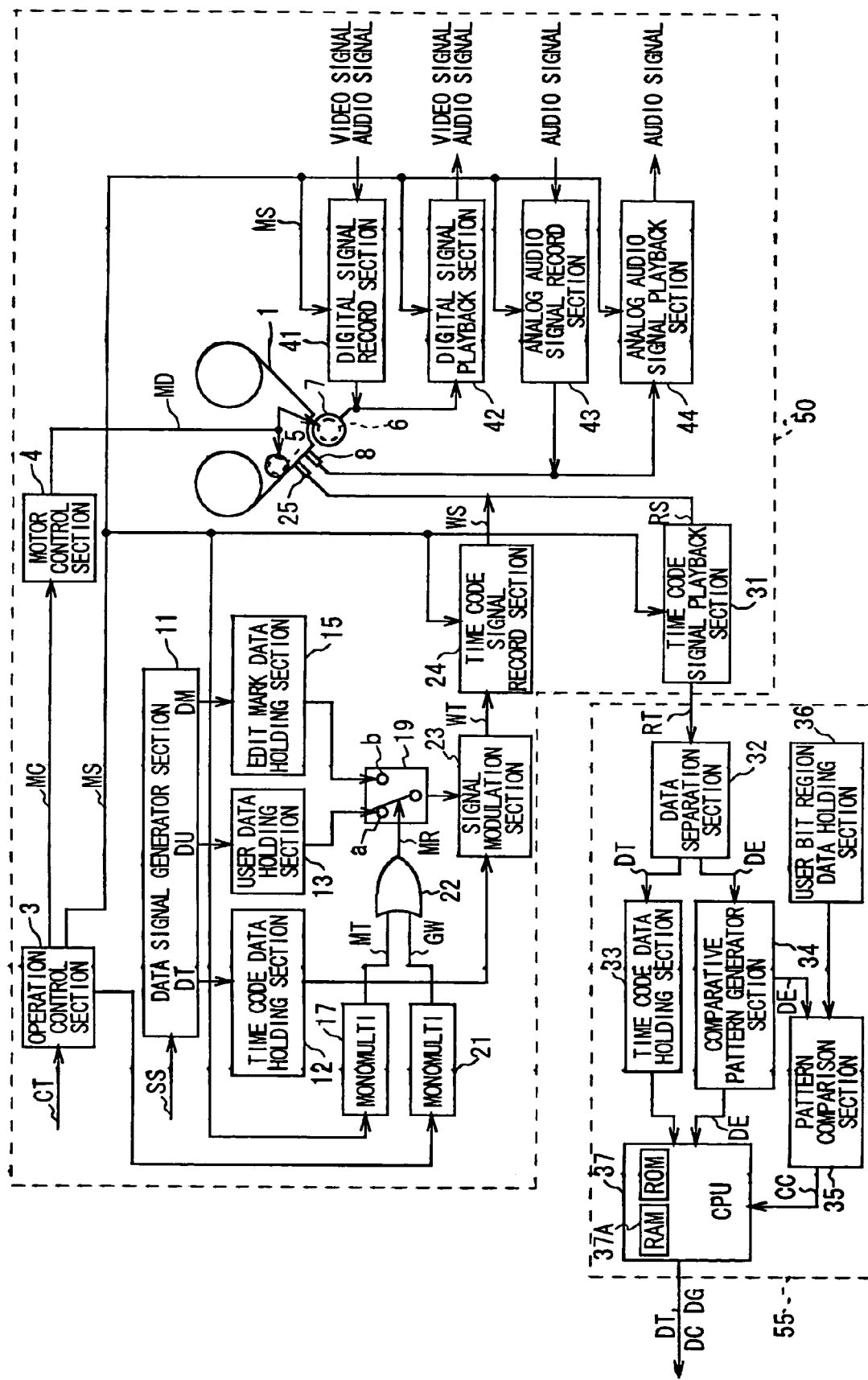
FIG. 4 is a block diagram showing the configuration of a tape record/playback section.

Here, FIG. 4 shows the configuration of the tape record/playback section 50 and the operation control section 3 generates a motor control signal MC and a mode signal MS by referring to the operation mode signal CT established by the system controller 60.

A motor control signal MC is supplied to the motor control section 4, whereas a mode signal MS is supplied to the time code signal record section 24, the time code signal playback section 31, the digital signal record section 41, the digital signal playback section 42, the analog signal record section 43, the analog signal playback section 44 and the quasi-stable multivibrator (hereinafter, referred to as "monomulti") 17.

In the motor control section 4, a motor driving signal MD is generated by referring to the supplied motor control signal MC. By supplying this motor driving signal MD to the capstan motor 5 and the drum motor 6, the magnetic tape 1 is run and the rotary head section 7 with a plurality of heads is rotated simultaneously.

In the digital signal record section 41, a digital video signal or a digital audio signal is converted into a record signal. Besides, on the basis of a mode signal MS supplied from the operation control section 3, this record signal is supplied to the rotary head section 7 to record the signal to a magnetic tape 1. The playback signal obtained from the rotary head section 7 by the playback of the magnetic tape 1 is supplied to the digital signal playback section 42 and converted into a digital video or audio signal.

Besides, in the analog audio signal record section 43, an analog audio signal is converted into a record signal. On the basis of a mode signal MS supplied from the operation control section 3, this record signal is recorded to a magnetic tape 1 supplied to the stationary head 8. The playback signal obtained from the stationary head 8 by the playback of the magnetic tape 1 is supplied to the analog-audio signal playback section 44 and converted into an analog audio signal. Besides, the data signal generator section 11 inputs the result that the setup of time or data (tape reel number or the like) to be recorded in a user's bit region or the setup of whether edit mark data are recorded or not are performed in the system controller 60 as setup signals SS.

On the basis of the setup signals SS from the system controller 60, the data signal generator section 11 generates time code data DT, user data DU and edit mark data DM of a specific pattern. The time code data DT generated here are held in the time code data holding section 12 and supplied to the signal modulation section 23 as well. Besides, the user data DU are held in the user data holding section 13 and supplied to the terminal a of the signal changeover switch 19. The edit mark data DM are held in the edit mark data holding section 15 and supplied to the terminal b of the signal changeover switch 19.

On the basis of a control signal supplied from the editing controller 100B, the system controller 60 (FIG. 3) is so arranged as to be capable of recording the above edit mark onto a magnetic tape 1 and a signal GW of high level "H" is supplied for a given time from the monomulti 21 to the logical sum circuit 22 when a control signal SG is supplied from the system controller 60 to the monomulti 21.

In the monomulti 17, a mode timing signal MT of high level "H" is generated for a given time when the operation mode proceeds to the recording operation on the basis of a mode signal MS. This mode timing signal MT is supplied to the logical sum circuit 22.

In the logical sum circuit 22, a logical sum of the GSM signal GW and the mode timing signal MT is taken and the logical sum signal MR is supplied to the signal changeover switch 19. In the signal changeover switch 19, a movable terminal is controlled by this logical sum signal MR.

In the signal modulation section 23, update of the time code data DT supplied from the time code data holding section 12 is automatically performed. Besides, the updated time code data are modulated together with the data selected by the signal changeover switch 19 to make a record time code signal WT in a format as mentioned above. This record time code signal WT is supplied to the time code signal record section 24.

In the time code signal record section 24, the supplied record time code signal WT is converted into a record signal WS and supplied to the stationary head 25 on the basis of the mode signal MS supplied from the operation control section 3. This tape record/playback section 50, comprising the time code signal playback means described below, can play back a time code, the above shot marks GSM1 and GSM2 and a record start mark at the time of quadruple-speed playback of material data (video and audio data).

Connected to the stationary head 25 constituting signal playback means is the time code signal playback section 31 and the playback signal RS read out via the stationary head 25 from the LTC (Longitudinal Time Code) track of a magnetic tape 1 is converted into a playback time code signal RT. This playback time code signal RT is supplied to the data separation section 32 constituting pattern detecting means of the marker detecting section 55. Incidentally, the time code signal playback means comprises a stationary head 25 and a time code signal playback section 31.

The data separation section 32, constituting pattern detecting means and time code playback means as well, separates time code data DT and user's bit region DE from the playback time code signal RT. Incidentally, the time code playback means comprises a data separation section 32 and a time code data holding section 33. The separated time code data DT are supplied to the time code data holding section 33 and held temporarily till the next time code data DT are supplied. Besides, the held time code data DT are supplied to the data processing section (CPU) 37. The user's bit region data DE are held in the user's bit holding section 34. The user's bit region data DEH held in the user's bit holding section 34 are supplied to the pattern comparison section 35 and the CPU 37.

Connected to the pattern comparison section 35 is the comparative pattern generator section 36, while the record start mark data DC or shot mark data DG generated in the comparative pattern generator section 36 are compared with the user's bit region data DE supplied from the user's bit holding section 34 and a comparative signal CC indicating the compared result is supplied to the CPU 37.

In the CPU 37, referring to the comparative signal CC supplied from the pattern comparison section 35, the time code data DT are stored in the RAM together with the corresponding record start mark RSM or shot marks GSM1 and GSM2 if the record start mark data DC coincide with the user's bit region data DE and if the shot mark data DG coincide with the user's bit region data DE. These stored time code data DT, record start mark RSM and shot marks GSM1 and GSM2 are supplied from the CPU 37 to the system controller 60 in the hybrid recorder 100A (FIG. 3).

(3) Preparing and Editing a Marker LOG File by Marker Search/Scan

In FIG. 3, when an editing operator manipulates the keyboard 122 or the mouse 121 while viewing the image of a GUI (Graphical User Interface) 120 displayed on the display screen of a monitor and inputs an instruction of searching the markers (record start mark RSM and shot marks GSM1 and GSM2) recorded on the magnetic tape 1 in the tape record/playback section 50 of a hybrid recorder 100A, the system controller 114 of an editing controller 100B transmits the control signal corresponding to the relevant specifying to the system controller 60 of the hybrid recorder 100A via the controlling communication cable 111 and scans both the time code track TT of the magnetic tape 1 with the aid of the stationary head 25 and the slant track TD with the aid of the rotary head section 7 while forwarding the magnetic tape 1 to the tape record/playback head section 50 at high speed.

The playback signal obtained by scanning the time code track TT with the aid of the stationary head 25 is converted into a playback time code signal RT at the time code playback signal playback section 31 and further time code data DT and user's bit region data DE are separated at the data separation section 32. When it is detected at the pattern comparison section 35 that the separated user's bit region data DE are equal to the record start mark data DC representing the record start mark RSM or to the shot mark data DG representing the shot mark GSM1 or GSM2, the time code data DT, the record start mark RSM and the shot mark GSM1, GSM2 are once stored in the RAM 37A of the CPU 37 and thereafter sent out to the system controller 114 of the editing controller 100B via the system controller 60 of the hybrid recorder 100A.

Besides, in this time, the playback signal obtained by scanning the slant track TD of a magnetic tape 1 with the aid of the rotary head section 7 is put into a digital video or audio signal and outputted in the digital signal playback section 42, then is decoded in the signal decoder section 80 of the hybrid recorder 100A and transmitted to the video compressor & capture 113 of the editing controller 100B.

On inputting the record start mark RSM and the shot mark GSM1, GSM2 from the hybrid recorder 100A, the system controller 114 of the editing controller 100B stores the time code corresponding to these record start mark RSM or shot mark GSM1, GSM2 into the marker type store domain 116 and the time code store domain 117 of the memory 125 and stores the video signal played back via the signal decoder section 80 of the hybrid recorder 100A into the stamp picture store domain 118 of the memory 125 via the video compression & capture 113.

Figure 5:
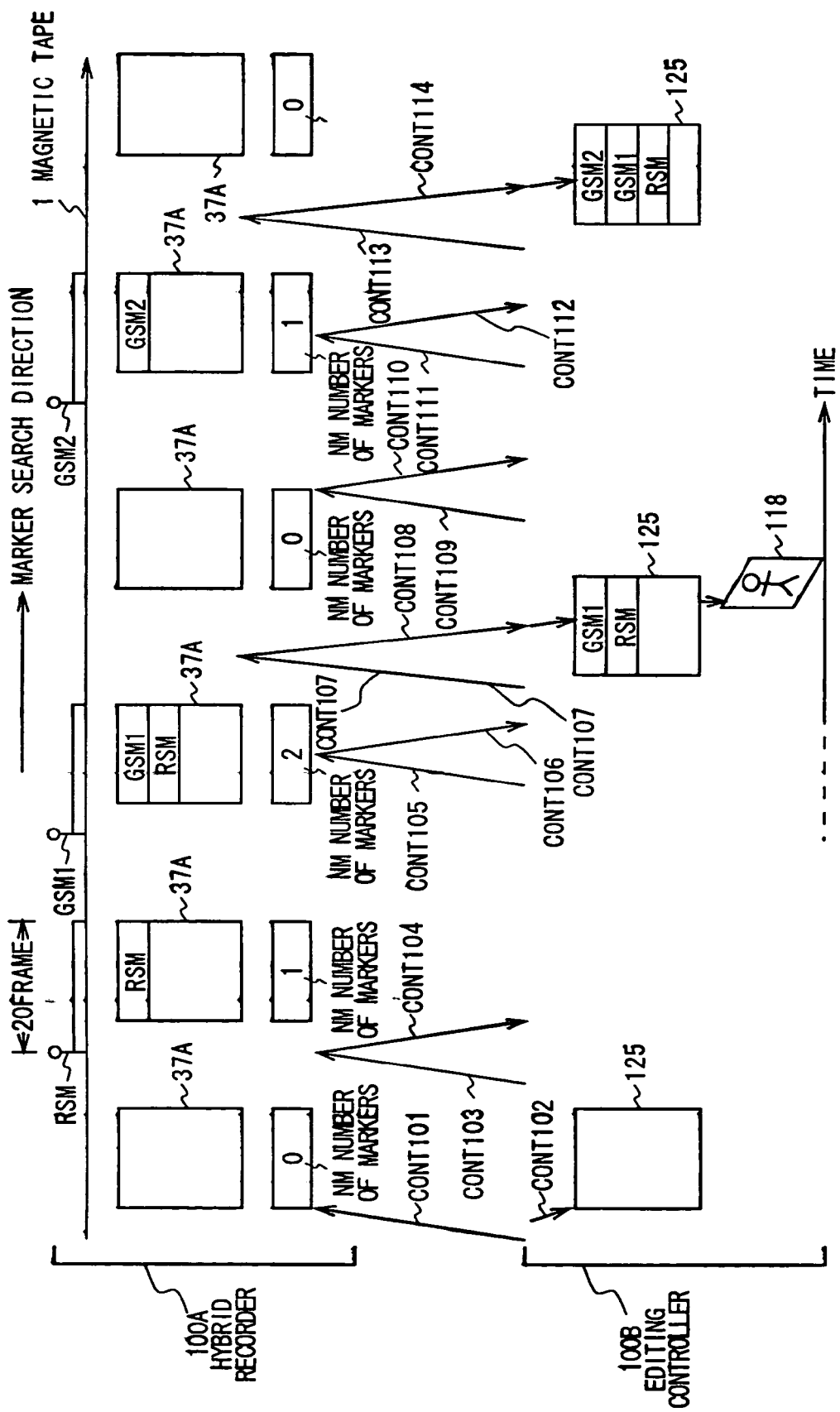
FIG. 5 is a schematic diagram serving for the description of a marker detection by marker search.

Here, FIG. 5 shows a procedure of reading out a marker and its stamp picture from the magnetic tape loaded on the tape record/playback section 50 of the hybrid recorder 100A and storing them into the memory 125 of the editing controller 100B. When an editing operator manipulates the keyboard 122 or the mouse 121 of the editing controller 100B to instruct the search of a marker after a magnetic tape 1 is loaded on tape record/playback section 50, the system controller 114 of the editing controller 100B sends out the control signal CONT 101 indicating the relevant instruction to the system controller 60 of the hybrid recorder 100A.

In accordance with the relevant control signal CONT 101, the system controller 60 first resets the data (marker data) of the RAM 37A (FIG. 4) provided as a marker data buffer at the marker detecting section 55. Besides, simultaneously with this, the system controller 114 of the editing controller 100B resets the data in the memory 125 by sending out a control signal CONT 102 to the memory 125.

When the search prearrangement is completed in this manner, the system controller 114 of the editing controller 100B instructs the hybrid recorder 100A to initiate the operation of searching a marker from the magnetic tape 1 of the tape record/playback section 50. Thereby, while playing back the magnetic tape 1 at high speed, the tape record/playback section 50 initiates the marker searching operation with its head position, and stores the detected marker into the RAM 37A as a marker data buffer in succession.

And, simultaneously with this, the system controller 114 of the editing controller 100B checks whether a marker is detected from the magnetic tape 1 or not by sending out a polling signal CONT 103 to the system controller 60 of the hybrid recorder 100A.

On receiving the polling signal CONT 103 from the editing controller 100B, the system controller 60 of the hybrid recorder 100A confirms the number NM of markers stored at this time in the marker data buffer (RAM 37A) and returns the result as a response signal CONT 104 to the editing controller 100B.

At this time, since no marker has yet been detected in the tape record/playback section 50, the number NM of markers in the RAM 37A is "0.1" Thus, the system controller 114 of the editing controller 100B performs no marker-incorporating operation and again sends out a polling signal CONT 105 to the system controller 60 of the hybrid recorder 100A.

At this time, in the tape record/playback section 50, two markers (record start mark RSM and shot mark GSM1) are detected and the marker data for these two are stored in the RAM 37A correspondingly. Accordingly, the system controller 60, having received a polling signal CONT 105, confirms that the number NM of markers stored in the RAM 37A is "2" and returns this result to the system controller 114 of the editing controller 100B as a response signal CONT 106.

When the system controller 114 sends out a marker data acquire request signal CONT 107 to the system controller 60 of the hybrid recorder 100A in answer to the relevant response signal CONT 106, the system controller 60 sends out the two marker data (record start mark data DC representing the record start mark RSM and shot mark data DG representing the shot mark GSM1) stored in the RAM 37A and their time code data DT as the response signals CONT 108 to the system controller 114.

The system controller 114 stores the relevant mark data DC and DG and time code data DT into the marker type store domain 116 and time code store domain 117 of the memory 125 and moreover stores the still pictures held at this time in the signal decoder section 80 of the hybrid recorder 100A via the video compression & capture 113 into the stamp picture store domain 118 of the memory 125 as stamp pictures corresponding to individual markers acquired at this time.

When marker data are stored into the memory 125 of the editing controller 100B in this manner, the system controller 60 of the hybrid recorder 100A resets the data in the RAM 37A.

Hereinafter, similarly, the system controller 114 of the editing controller 100B sends out a polling signal CONT 109 to the system controller 60 of the hybrid recorder 100A, receives the response signal CONT 110 corresponding to it, makes no write of marker data into the memory 125 because no marker data is stored at this time in the RAM 37A and further sends out a polling signal CONT 111 to the system controller 60 of the hybrid recorder 100A subsequently.

At this time, in the hybrid recorder 100A, a shot mark GSM2 is detected from the magnetic tape 1 and its shot mark data DG are stored in the RAM 37A. Accordingly, when the system controller 60 returns the number NM of markers stored in the RAM 37A to the system controller 114 of the editing controller 100B by a response signal CONT 112 corresponding to the polling signal CONT 111, the system controller 114 sends out a marker data acquire request signal CONT 113 for acquiring the relevant stored marker data to the system controller 60 of the hybrid recorder 100A, so that the system controller 60 sends out the data (shot mark data DG representing the shot mark GSM2) of the marker stored in the RAM 37A and the time code data DT thereof as a response signal CONT 114 to the system controller 114.

The system controller 114 additionally writes the data of the inputted marker into the corresponding domain of the memory 125. Thus, in the memory 125 of the editing controller 100B, the data of individual markers recorded on the magnetic tape 1 and stamp pictures thereof are stored and they are registered as the data of the marker LOG file mentioned below.

When data of markers are stored into the memory 125, the system controller 114 of the editing controller 100B displays data of individual markers on the GUI screen displayed on a monitor via a GUI 120 as a marker LOG file.

Namely, by displaying a GUI on the display screen of a monitor, the system controller 114 of the editing controller 100B displays the editing condition to an editing operator and allows the editing operator to input various editing instructions by the input manipulation of a cursor on the relevant display screen in accordance with given manipulation display parts.

Figure 6:
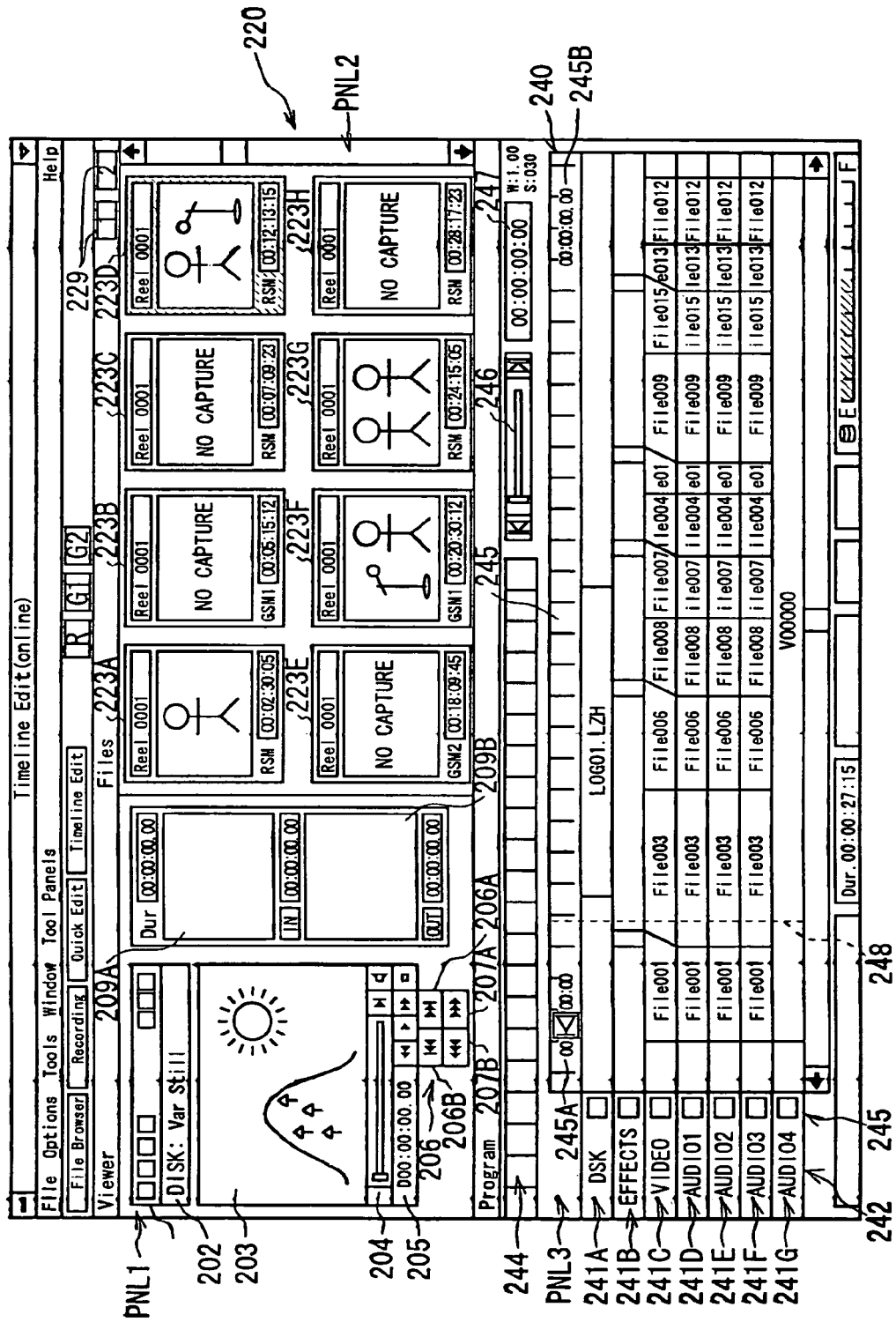
FIG. 6 is a schematic diagram showing a GUI screen.

In this case, as shown in FIG. 6, the GUI screen displayed on the display screen of a monitor is roughly composed of three display panels. The Viewer panel PNL1, first display panel, is so arranged as to display the image of the present selected device (tape record/playback section 50 or disk record/playback section 70) or the image in the course of editing on the video window 203.

In this Viewer panel PNL1, the source button group 201 is a button group for selecting editable material sources in the editing apparatus 100 including the relevant editing controller 100B. With this embodiment, editing operator's clicking a manipulation button of the relevant button group 201 on the screen allows an external source inputted via the tape record/playback section 50, the disk record/playback section 70 or an external input terminal to be selected.

Besides, the operating condition display section 202 displays the operating condition of the material source selected among the source button group 201 in terms of characters. Besides, the scroll bar 204 is allowed to cue up the material source displayed on the video window 203 in the unit of a frame after clicking the left or right button of the relevant scroll bar 204. The time code of the image displayed on the video window 203 is displayed on the time code display part 205.

Furthermore, at the bottom of the video window 203, the control button group 206 for controlling the device (tape record/playback section 50 or disk record/playback section 70) during the playback of images displayed on the video window 203 at this time is displayed and an editing operator can send out a desired control instruction to the device by clicking a manipulation button of the relevant control button group 206.

Provided in part of this control button group 206 are marker search forward/backward buttons 206A and 206B. Editing operator's clicking the marker search forward button 206A or marker search backward button 206B allows the system controller 114 to proceed to the search operation mentioned below and to cue up the material source at the position of a marker to be searched among the markers (record start mark RSM or shot mark GSM1 or GSM2) recorded on a magnetic tape 1 during the fast feed or rewind in the forward or backward direction.

The CPU 114 (FIG. 3) operating a GUI 120 registers the marker cued up thus and the corresponding image (stamp picture) onto the marker LOG file displayed on the Files panel PNL2 (FIG. 5) of the GUI screen.

Besides, provided in part of this control button group 206 are marker scan forward/backward buttons 207A and 207B. Editing operator's clicking the marker scan forward button 207A or marker scan backward button 207B allows the system controller 114 to proceed to the scanning operation mentioned below and to incorporate the markers (record start mark RSM and shot marks GSM1 and GSM2) recorded on the magnetic tape 1 together with the picture (stamp picture) to which the markers are attached during the fast feed or rewind in the forward or backward direction at high speed but at 20-fold speed or lower so as to be capable of incorporating a stamp picture.

The marker marker-scanned in this manner and the corresponding image (stamp picture) are registered onto the marker LOG file displayed on the Files panel PNL2 of a GUI screen.

Besides, provided on the Viewer panel PNL1 are an IN point image display part 209A and an OUT point image display part 209B. When an editing operator specifies the IN point and the OUT point at the time of editing by selecting stamp pictures registered on the marker LOG file of the Files panel PNL2, the system controller 114 displays the stamp picture corresponding to the specified IN point together with its time code at the IN point image display part 209A and the stamp picture corresponding to the specified OUT point together with its time code at the OUT point image display part 209B.

Figure 7:
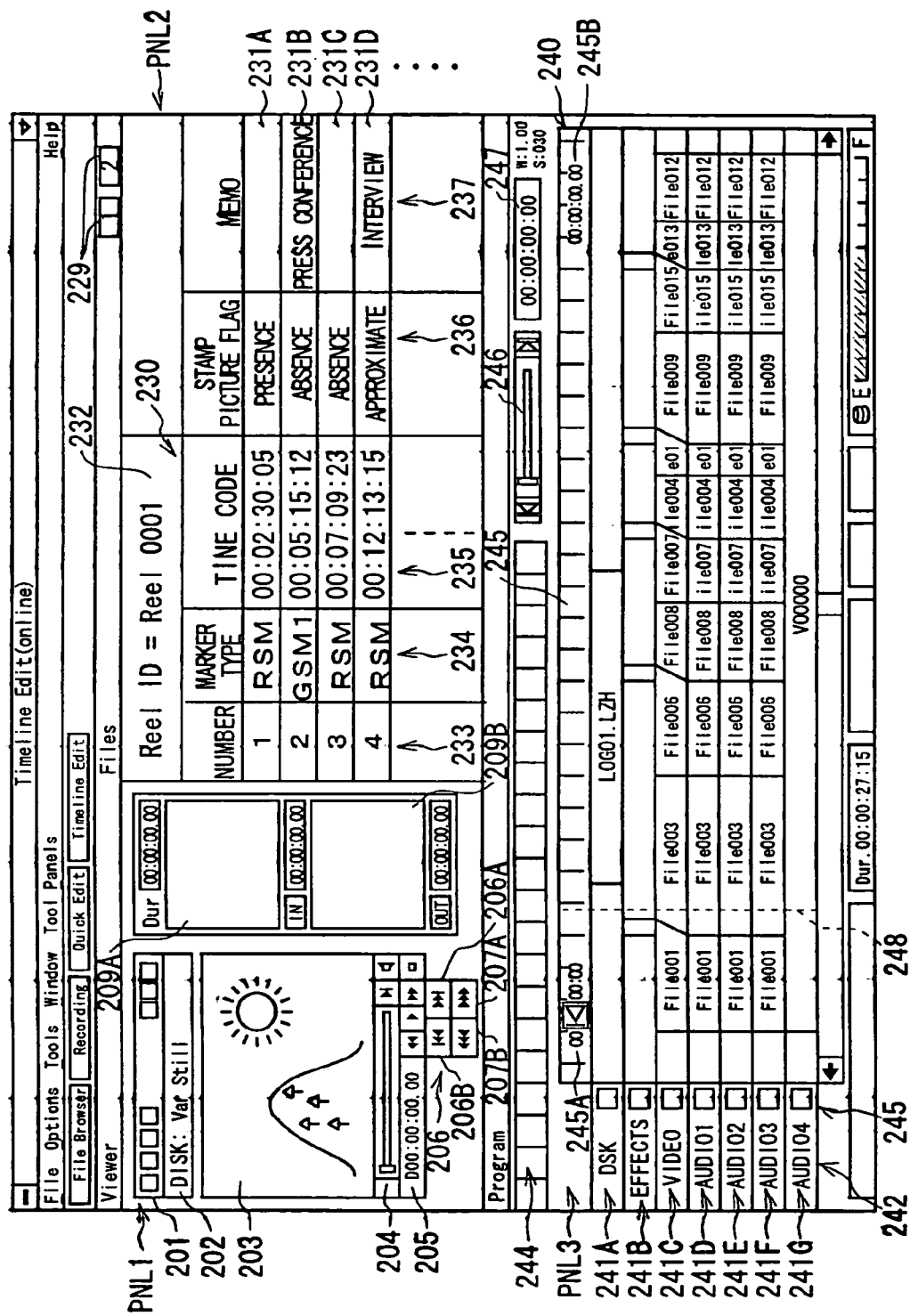
FIG. 7 is a schematic diagram showing a GUI screen.

The Files panel PNL2, second display panel of the GUI screen, is a panel for displaying a stamp picture registered on the marker LOG file and its time code, while the system controller 114 is so arranged as to be capable of switching on either of a method for displaying information items about a marker registered on the marker LOG file by means of the stamp picture display screen part 220 with stamp images arranged as shown in FIG. 6 or a method for displaying the types of markers and their time codes as information items about markers registered on the marker LOG file by means of a marker list 230 as shown in FIG. 7 in answer to the instruction of an editing operator.

On finding each marker (record start mark RSM and shot marks GSM1 and GSM2) on a magnetic tape 1 by a marker search operation or the marker scanning operation mentioned below, the system controller 114 incorporates the image (stamp picture) corresponding to the relevant marker and its time code on the magnetic tape 1 and displays these in terms of a stamp picture display screen part 220 (FIG. 6) or a marker list 230 (FIG. 7), the first or second method for displaying the marker LOG file.

When an editing operator selects the display with the aid of a stamp picture display screen part 220 by manipulating the keyboard 122 or the mouse 121 to click a selective button 229 of the Files panel PNL2, the system controller 114 displays their corresponding marker information items on marker information display parts 223A, 223B, 223C, ... for all individual markers incorporated.

Figure 8:
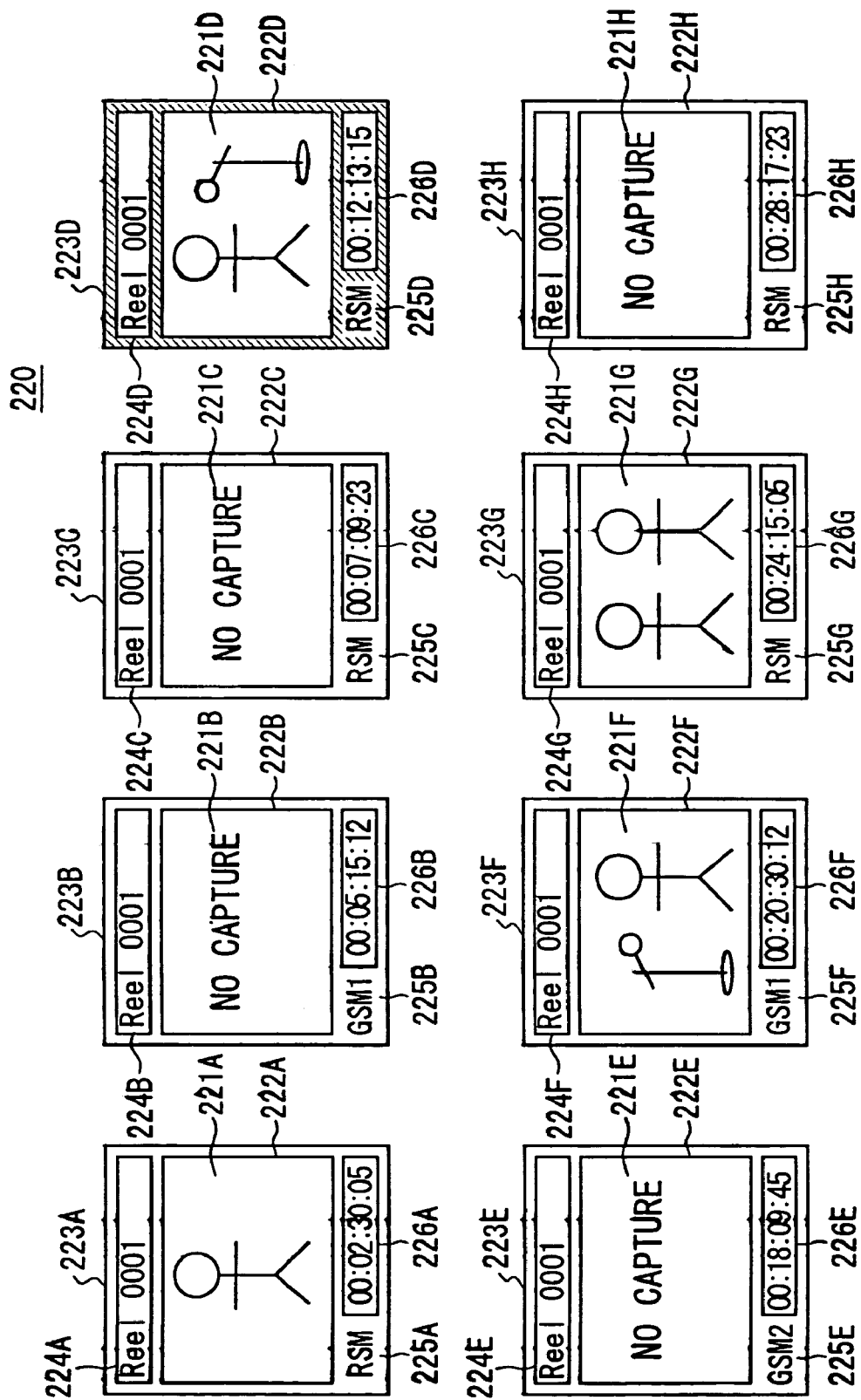
FIG. 8 is a schematic diagram showing a marker information display part.

Provided at individual marker information display parts 223A, 223B, 223C, ..., as shown in FIG. 8, are tape identification display parts 224A, 224B, 224C, ... for displaying the types of magnetic tapes 1 with respective markers recorded, stamp picture display parts 222A, 222B, 222C, ... for displaying the stamp pictures 221A, 221B, 221C, . . . corresponding to respective markers, marker type display parts 225A, 225B, 225C, . . . for displaying the types of respective markers and time code display parts 226A, 226B, 226C, . . . for displaying the time codes at the positions where respective markers are attached.

In FIG. 8, for example, the marker information display part 223A indicates as marker information items that the marker represented by the relevant marker information display part 223A is recorded on the tape number-"Reel 0001," the stamp picture 221A at the attached position of the relevant marker is an image displayed on the stamp picture display part 222A, the type of the relevant marker is a record start mark RSM and its time code is "2 min 30 sec 05."

In contrast to this, when an editing operator selects the display in terms of a marker list 230 by manipulating the keyboard 122 or mouse 121 to click a selective button 229 on the Files panel PNL2, the system controller 114 displays the marker information items corresponding to individual markers at respective marker information display column 231A, 231B, 231C, . . . of the marker list 230 shown in FIG. 7 for every incorporated marker.

Provided in this marker list 230 are a tape identification display part 232 for identifying the magnetic tape 1 with respective markers displayed at individual marker information display columns 231A, 231B, 231C, . . . of the marker list 230 recorded thereon, a marker number display part 233 for representing the attached sequence of markers in numbering, a marker type display part 234 for displaying the types of individual markers, a time code display part 235 for displaying the respective time codes at the attached positions of individual markers, a stamp picture flag display part 236 for displaying whether a stamp picture corresponding to each marker is incorporated and a memo display part 237 for displaying the memo information comprising desired information items inputted by an editing operator manipulating the keyboard 122 or the like concerning individual markers.

In FIG. 7, for example, the marker information display column 231A indicates that the marker represented by the relevant marker information display column 231A is recorded on the tape number "Reel 0001," the type of the relevant marker is a record start mark RSM, the time code at the attached position of the relevant marker is "2 min 30 sec 05," the stamp picture corresponding to the relevant marker is incorporated and no memo information item corresponding to the relevant marker is inputted.

Incidentally, in case of scanning a marker during the fast playback or fast feed/rewind of a magnetic tape 1, it is difficult to incorporate a stamp picture and "absence" indicating that no stamp picture is incorporated is displayed at the stamp picture flag display part 236 of the marker list 230 if the scanning speed is 20-fold speed or higher, whereas displayed at stamp picture flag display part 236 is "approximate" indicating that the stamp picture at an approximate position inaccurate relative to the marker position is incorporated by incorporating a stamp picture near the marker position for a scanning speed equal to or lower than 20-fold speed.

Especially, with a recorded magnetic tape 1 loaded on the tape record/playback section 50, editing operator's clicking the marker scanning button 207A or 207B of a GUI screen to specify the marker scan operation allows the tape record/ playback section 50 of the hybrid recorder 100A to fast scan a magnetic tape 1 at 20-fold speed or lower in the direction specified with the clicked marker scan button and search a marker.

Figure 9:
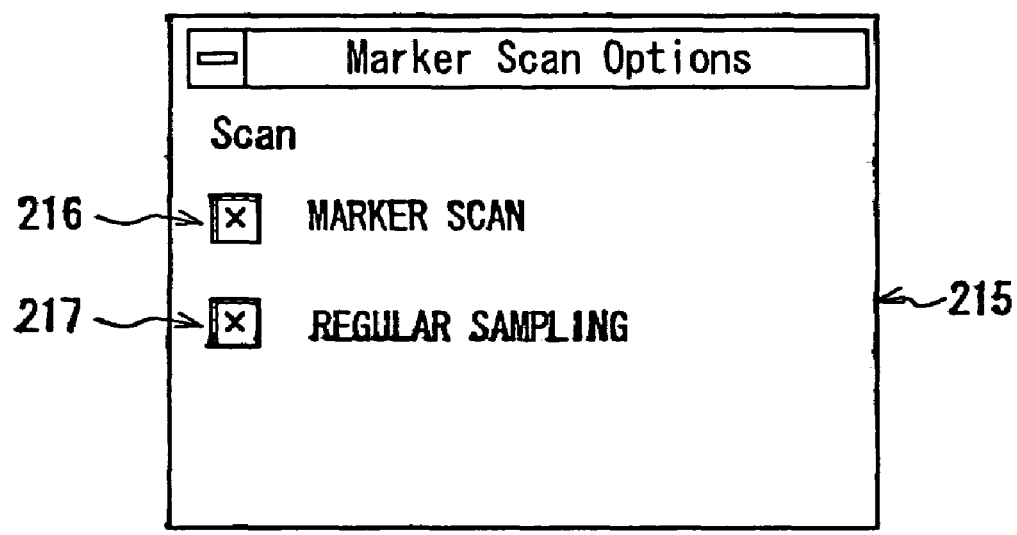
FIG. 9 is a schematic diagram showing a dialog box for setting the marker scanning and regular sampling.
Figure 10:
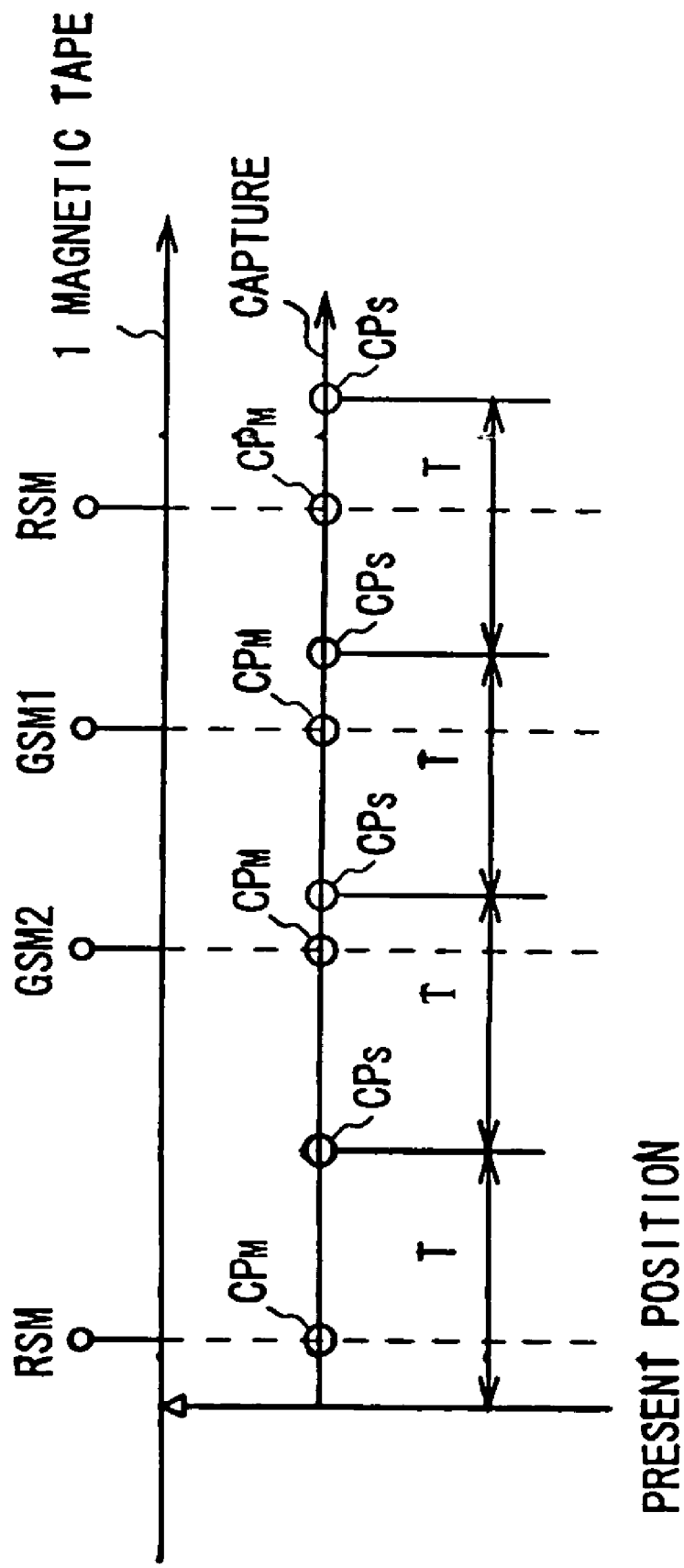
FIG. 10 is a schematic diagram showing the marker scanning operation.
Figure 11:
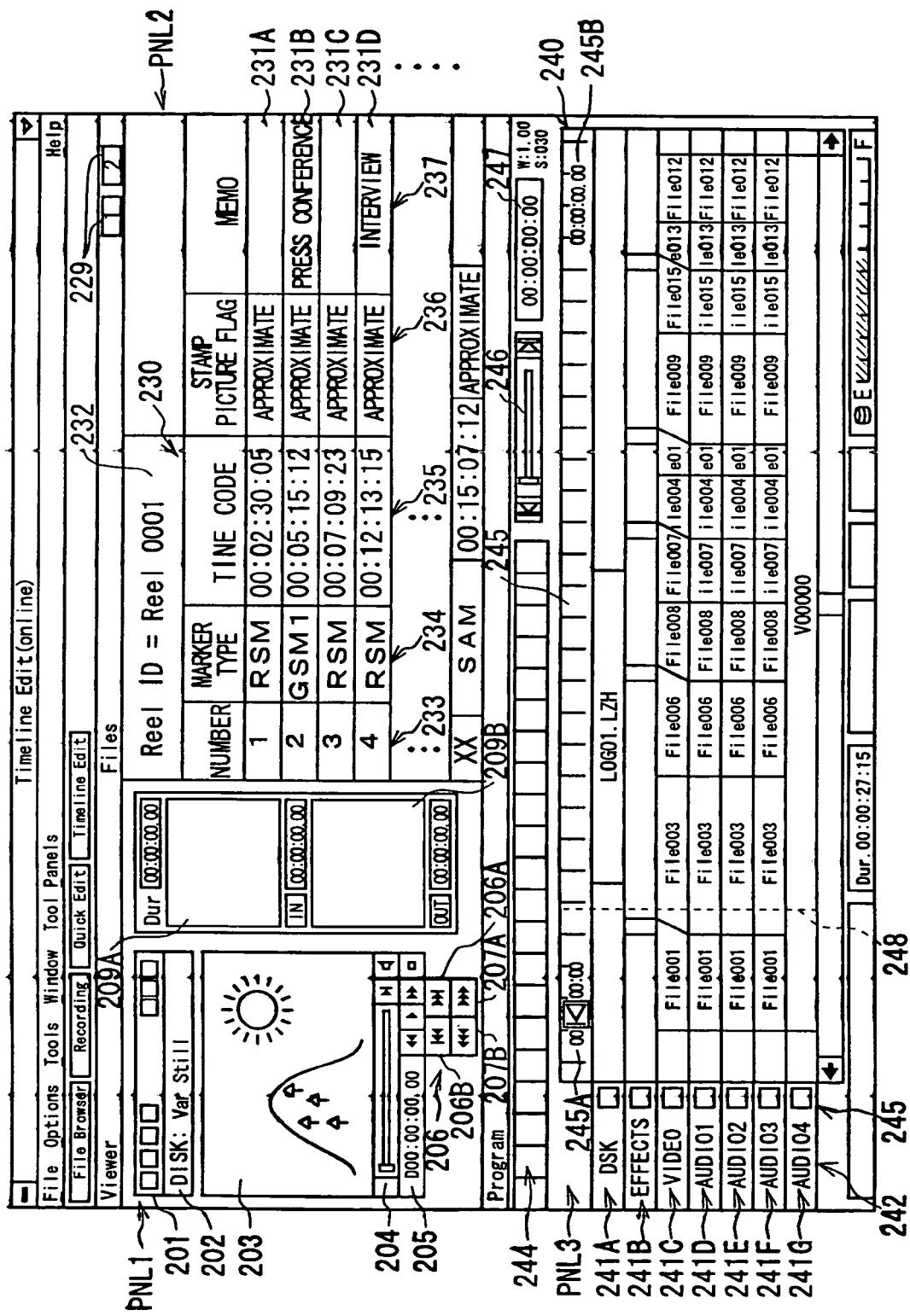
FIG. 11 is a schematic diagram showing a GUI screen.

In this case, the GUI 120 displays the dialog box shown in FIG. 9 on the GUI screen according to an editing operator clicking the marker scan button 207A or 207B and waits for his instruction of either marker scanning or regular sampling or both of them. In this case, when an editing operator clicks both the marker scan button 216 and the regular sampling button 217, the system controller 114 incorporates a sampling picture CPS together with its time code into the memory 125 at every time T that has elapsed as shown in FIG. 10 at the same time while fast searching all individual markers recorded in advance on the magnetic tape 1 at 20-fold speed or lower according to clicking. When stamp pictures CPM corresponding to individual markers and sampling pictures CPS by means of regular sampling are incorporated into the memory 125 in this manner, "approximate" is displayed at the stamp picture flag display part 236 and "SAM" is displayed at the marker type display part 234 corresponding to sampled pictures incorporated by the regular sampling in the marker list 230 of the GUI screen as shown in FIG. 11. Due to such a process, for a marker with "absence" or "approximate" displayed at the stamp picture flag display part 236 of a marker list 230, the needed marker stamp picture cued up at the accurate position can be incorporated by an editing operator clicking the marker search forward/backward button 206A or 206B of a GUI screen as shown in FIGS. 7 and 11.

Figure 12:
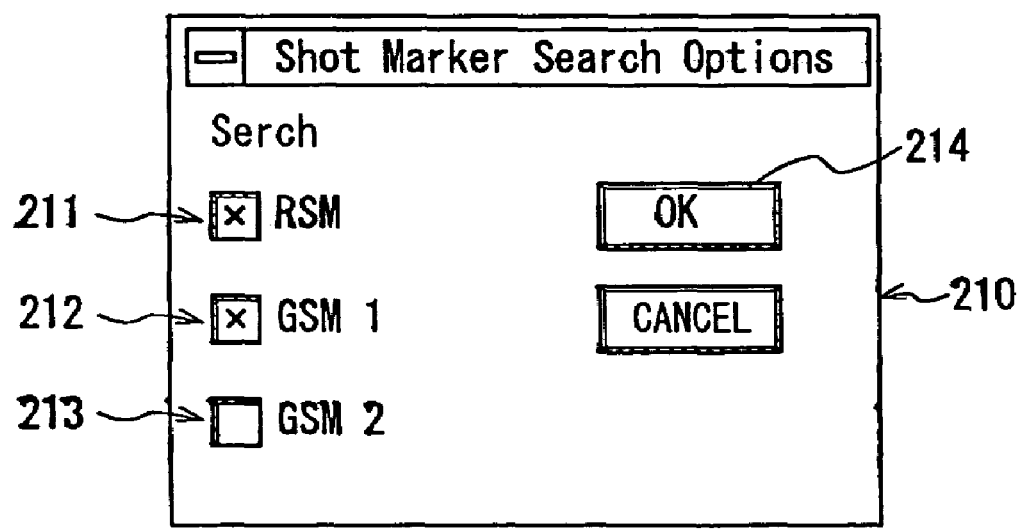

In this case, according to an editing operator clicking the marker search forward/backward button 206A or 206B of a GUI screen, the system controller 114 displays the dialog box 210 shown in FIG. 12 on the GUI screen in the display screen of a monitor and an editing operator selects the marker to be searched from among the search target specify buttons 211, 212 and 213 of the relevant dialog box 210. The selectable markers may be of a single type or of multiple types. By the way, the situation shown in FIG. 12 is a situation that the record start mark RSM and the first shot mark GSM1 are selected as search targets by an editing operator clicking the search target specify buttons 211 and 213 in the dialog box 210.

Figure 13:
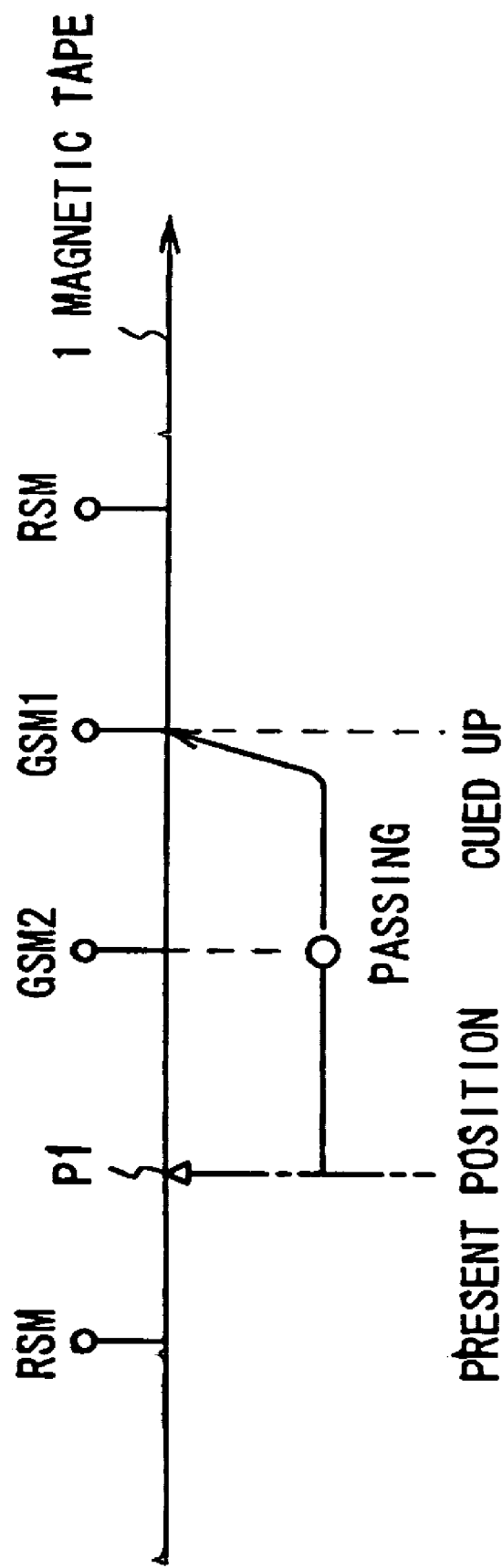
FIG. 13 is a schematic diagram serving for the description of an accurate marker search operation.

When an editing operator clicks the execution button 214 of the dialog box 210 after specifying the marker to be searched in the dialog box 210 on a GUI screen like this, the system controller 114 searches the record start mark RSM and the shot mark GSM1 in the direction corresponding to the marker search forward/backward button 206A or 206B clicked by him at this time from the present position P1 as shown in FIG. 13.

Consequently, the system controller 114 initiates the search of markers from the present position P1 in the direction corresponding to the marker search forward button 206A clicked by the editing operator in FIG. 13, passes the shot mark GSM2 not selected at this time and cues up the shot mark GSM1 selected at this time. At that time, the system controller 114 displays the stamp picture of the shot mark GSM1 cued up on the video window 203 of the Viewer panel PNL1 and the display characters "GSM1" representing the shot mark GSM1 at its one part.

By repeating the cue-up concerning the marks selected thus, the system controller 114 incorporates the images at the cued up positions as stamp pictures into the stamp picture store domain 118 of the memory 125 of the editing controller 100B and updates/registers them as stamp pictures of markers without any stamp picture incorporated or markers with approximate stamp pictures incorporated. Incidentally, its time code is accurately incorporated in incorporating a marker. Thus, by the update/registration of accurate stamp pictures, the situation that stamp pictures and their time codes coincide is obtained.

Due to such a process, with respect to "absence" indicating that no stamp picture is incorporated and "approximate" indicating that an approximate stamp picture is incorporated in the stamp picture flag display part 236 of a marker list 230, the stamp picture coincident with the time code of a marker is registered and its indication changes into "presence" every time when a marker position is accurately cued up by the accurate search operation mentioned above concerning FIGS. 12 and 13 and the relevant correct stamp picture is incorporated.

Based on the information items of individual markers registered on the marker LOG file displayed on the Files panel PNL2, the editing operator can make a confirmation of markers recorded on the magnetic tape 1, a specification of IN points and OUT points or the like in the editing operation.

Namely, in FIG. 6, the Program panel PNL3, third display panel of the GUI screen, is so arranged as to, based on the instruction of an editing operator, successively display which of information items about individual markers registered on the marker LOG file of the Files panel PNL2 is the information item about the IN and OUT points of materials necessary for the edit on the editing tracks 241A to 241G referred to as time line in connection with the material data (video and audio data) recorded on the magnetic tape 1.

When an editing operator clicks the information item (stamp picture or review display) of each marker registered on the marker LOG file displayed on the Files panel PNL2 and simultaneously drags it to the In point image display part 209A of the Viewer panel PNL1, in this case, the GUI 120 displays the stamp picture of the marker specified at this time at the IN point image-display part 209A.

Besides, in a similar manner, when an editing operator clicks the information item (stamp picture or review display) of each marker registered on the marker LOG file displayed on the Files panel PNL2 and simultaneously drags it to the OUT point image display part 209B of the Viewer panel PNL1, in this case, the GUI 120 displays the stamp picture of the marker specified at this time at the OUT point image display part 209B.

When the stamp picture of the marker specified by an editing operator from the marker LOG file is displayed on the IN point image display part 209A and the OUT point image display part 209B of the Viewer panel PNL1 like this, the editing operator moves the relevant stamp picture to a desired position on the time line by dragging after confirming it.

Thereby, the material data sandwiched between the IN point and the OUT point specified anew by the editing operator are registered as an edit material data file on the time line and simultaneously the corresponding material data are recorded from the magnetic tape 1 into the hard disk region of the disk record/playback section 70 during the edit preparing at this time. Meanwhile, recording from the magnetic tape 1 to the hard disk may be carried out at one time by an editing operator clicking a given screen key after all files needed for him are lined on the time line. Besides, specifying an edit material data file may be executed by specifying its IN point and its length.

The GUI 120, with the time line tool bar 244 provided in the Program panel PNL3, is so arranged as to execute the operation corresponding to the time line tool bar 244 manipulated by editing operator is clicking. By displaying the time line scale 245 along the time line, the GUI 120 allows an editing operator to check the time code on each time line with the relevant time line scale 245. Incidentally, the time code at the left end of the time line scale 245 is displayed by the time line scale position indicator 245A, whereas the time code at the right end of the time line scale 245 is displayed by the time line scale position indicator 245B.

Incidentally, as a method for preparing an edit list, it may be adopted to prepare a record list in place of a preparing method on the time line mentioned above by referring to FIG. 6. In this case, as shown in FIG. 14, the GUI 120 can display a screen for preparing a record list on a monitor by editing operator's specifying.

Figure 14:
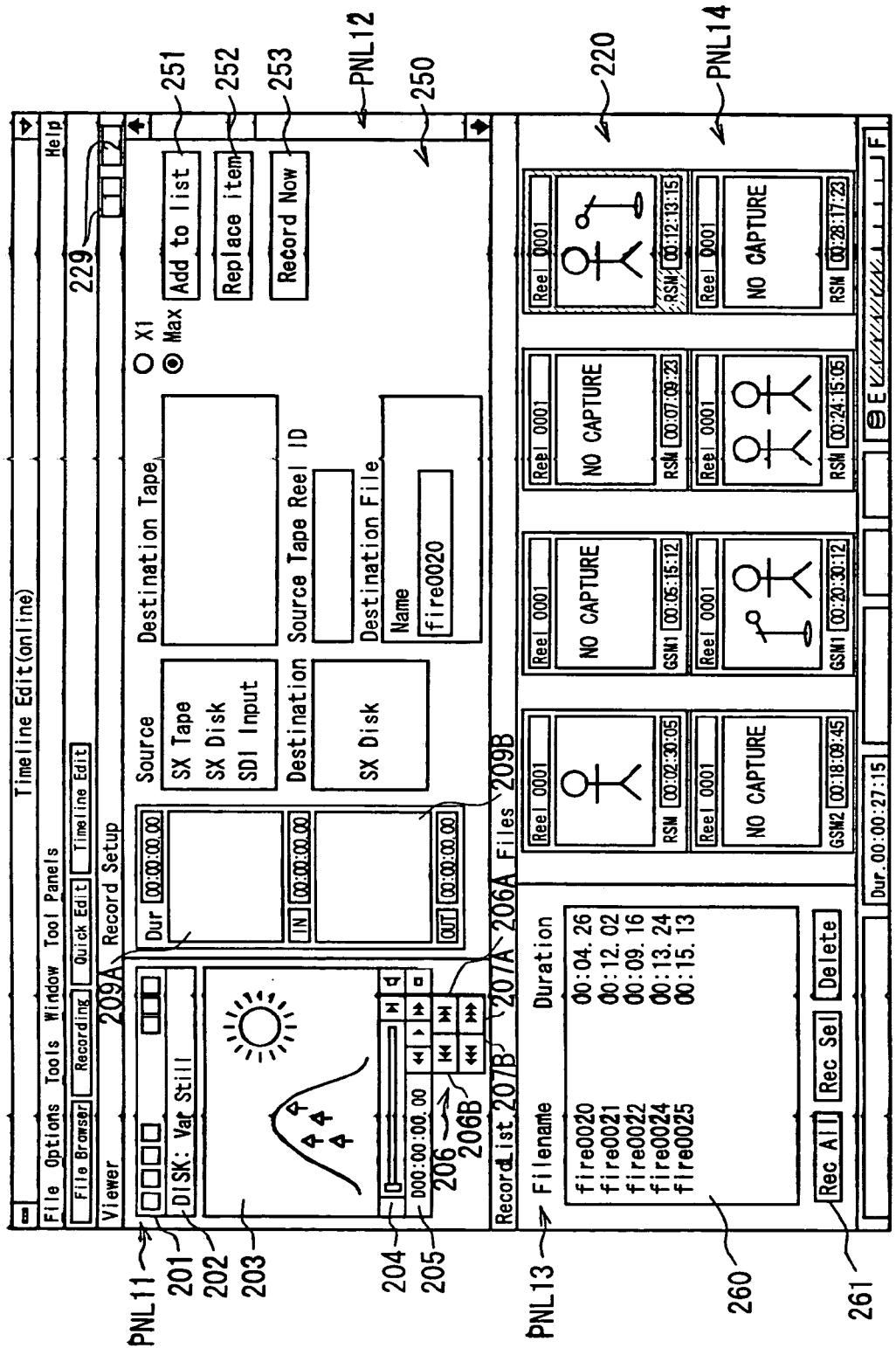
FIG. 14 is a schematic diagram showing a GUI screen.

Namely, in FIG. 14, the Viewer panel PNL11 is equipped with a video window 203, a control button group 206 and the like as with the Viewer panel PNL1 mentioned above by referring to FIG. 6 and allows an editing operator to send out various instructions to devices such as tape record/playback device.

Besides, as with the Files panel PNL2 mentioned above by referring to FIG. 6, the Files panel PNL14 is so arranged as to display the information items (such as stamp picture, file name and time code) about the marker incorporated in the memory 125 as a marker LOG file by executing the search operation through the material data recorded on the magnetic tape 1 and an editing operator selects a desired marker information item necessary for editing from these stamp pictures and drags it to the IN point image display part 209A and the OUT point image display part 209B of the Record Setup panel PNL12.

The Record Setup panel PNL12 is a region in which various setups are made to register in the Record List panel PNL13 a marker information item registered on the marker LOG file of the Files panel PNL14. When an editing operator further clicks the Add to List button 251 with a stamp picture registered at the IN point image display part 209A and the OUT point image display part 209B, the GUI 120 registers the material data portion registered at this time which is sandwiched between the IN point image and the OUT point image correspondingly into the record list review display part 260 of the Record List panel PNL13 as an edit material data file. Incidentally, as the setup operation of an edit material data file, it is available to specify an IN point and its length.

Along these lines, referring to the marker information items registered on the marker LOG file, the GUI 120 selects the editing material data file of the scene needed for the edit operation in accordance with the manipulation of an editing operator and arranges the relevant selected marker information items on the record list review display part 260 in the sequence of editing.

Incidentally, in case of rearranging the edit material data files displayed on the record list review display part 260, an editing operator specifies the file to be rearranged on the record list review display part 260 in advance and clicks the Replace Item button 252 of the Record Setup panel PNL12 in this situation, then the GUI 120 rearranges the specified file on the record list review display part 260.

After the necessary files are completely gathered in this manner on the record list review display part 260, the system controller 114 keeps recording the material data on the magnetic tape 1, corresponding to files arranged in the record list review display part 260, into the hard disk in sequence by an editing operator clicking the Rec All button 261 of the Record List panel PNL13. A plurality of files registered thereby in the record list review display part 260 are constructed as a series of edited data on the hard disk.

Incidentally, the timing of recording from the magnetic tape 1 to the hard disk is not limited to the time after the record list review display part 260 is completed. In FIG. 14, for example, editing operator's clicking the Record Now button 253 of the Record Setup panel PNL12 allows the system controller 114 to record the corresponding material data on the magnetic tape 1 onto the hard disk for every edit material data file registered in the record list review display part 260.

Figure 15:
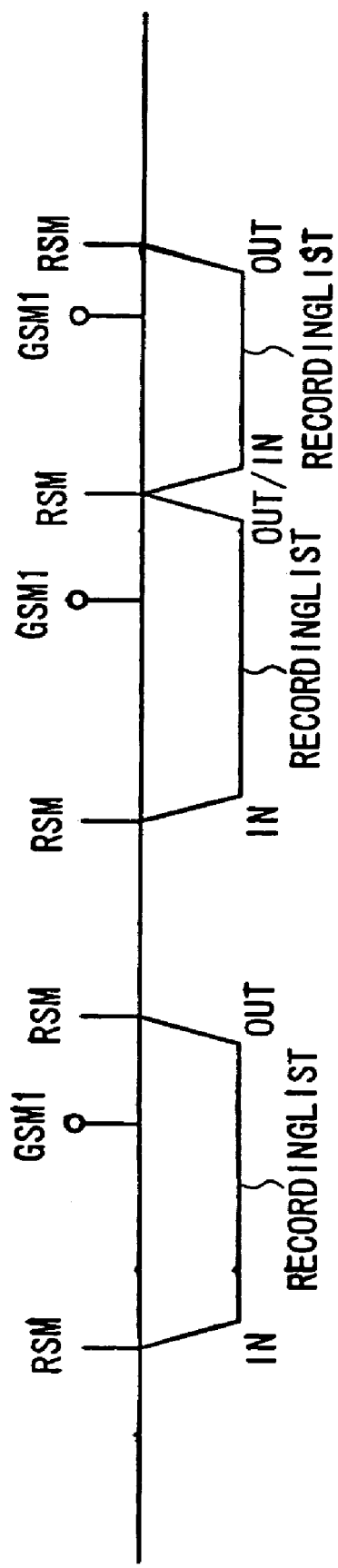
FIG. 15 is a schematic diagram serving for the description of operation of registering edit material data into a record list.

Besides, as a method for registering an edit material data file into the record list review display part 260, it is allowable to register all the data between the two record start marks RSM sandwiching at least one shot mark GSM1 or GSM2 as an edit material data file as shown in FIG. 15 in place of a method for setting an edit material data file to be registered from the marker LOG file. If registered so, the edit material data file including at least one shot mark GSM1 or GSM2 necessary for editing is recorded in the record list review display part 260. Incidentally, if not only the data between two record start marks RSM including at least one shot mark GSM1 or GSM2 but also the data between two record start marks RSM including no shot mark GSM1 or GSM2 are so arranged as to be registered in the record list review display part 260, all data sandwiched between the record start marks RSM can also be registered as edit material data file.

(4) Preparing and Editing a Marker Log File by the Download

In FIG. 3, when an editing operator manipulates the keyboard 122 or the mouse 121 while viewing the GUI (Graphical User Interface) 120 displayed on the display screen of a monitor and specifies the download of material data from the tape record/playback section 50 of the hybrid recorder 100A to the disk record/playback section 70, the system controller 114 of the editing controller 100B sends out the control signal corresponding to the relevant specifying via the controlling communication cable 111 to the system controller 60 of the hybrid recorder 100A.

On receiving the control signal, the system controller 60 initiates the playback operation at quadruple speed from the head position of a tape, for example, in accordance with the relevant control signal, starts tape run and rotates the rotary head section 7. Incidentally, the playback speed is not limited to quadruple speed but may be any downloadable speed. Besides, in this time, since the system controller 60 outputs a mode signal MS indicating the playback operation from the operation control section 3 of the tape record/playback section 50 (FIG. 4), the playback signal resultant at this time from scanning the slant track TD of the magnetic tape 1 at the rotary head section 7 is outputted after converted into a digital video or audio signal at the digital signal playback section 42 and recorded into the disk at the disk record/playback section 70 (FIG. 3). Further, the playback signal obtained by scanning the audio track TA at the stationary head 8 is outputted after converted into an analog audio signal at the analog audio signal playback section 44 and recorded into the disk at the disk record/playback section 70 (FIG. 3).

The playback signal obtained by scanning the time code track TI at the stationary head 25 is converted into a playback time code signal RT at the time code playback signal playback section 31 and further separated into time code data DT and user's bit region data DE at the data separation section 32. When it is detected at the pattern comparison section 35 that this separated user's bit region data DE are equal to the record begin mark data DC or the shot mark data DG, the time code data DT, the record start mark RSM and the shot marks GSM1 and GSM2 of this time are stored into the RAM 37A of the CPU 37.

The CPU 37 supplies the record start mark data DC and the shot mark data DG representing the record start mark RSM and the shot marks GSM1 and GSM2 (including an edit mark EDM when the edit mark EDM is recorded on the magnetic tape 1) stored in the RAM to the system controller 60 (FIG. 3) together with the time code data DT. On receiving the record start mark data DC or the shot mark data DG, the system controller 60 supplies an image resting control signal CONT 1 correspondingly to the signal decoder section 80 to hold the image in the course of decoding in the signal decoder section 80 as a still picture in the memory within the relevant signal decoder section 80 and to make the relevant still picture transmittable to the video compression & capture 113 of the editing controller 100B as a stamp picture. And, at the time, on the basis of the File Time Code FTC of the disk and the time data TD embedded in the video signal of the file, supplied from the disk record/playback section 70, the system controller 60 calculates the file time data code corresponding to the still picture in the signal decoder section 80 and makes it transmittable to the system controller 114 of the editing controller 100B together with the mark code representing the mark data (record start mark data DC or shot mark data DG) corresponding to the relevant still picture via the controlling communication cable 111.

Thereafter, if necessary, the record start mark RSM and the shot marks GSM1 and GSM2 recorded in the magnetic tape 1 are transmitted to the editing controller 100B together with their time codes and stamp pictures, stored into the marker type store domain 116, the time code store domain 117 and the stamp picture store domain 118 of the memory 125, respectively and registered onto the marker LOG file.

Figure 16:
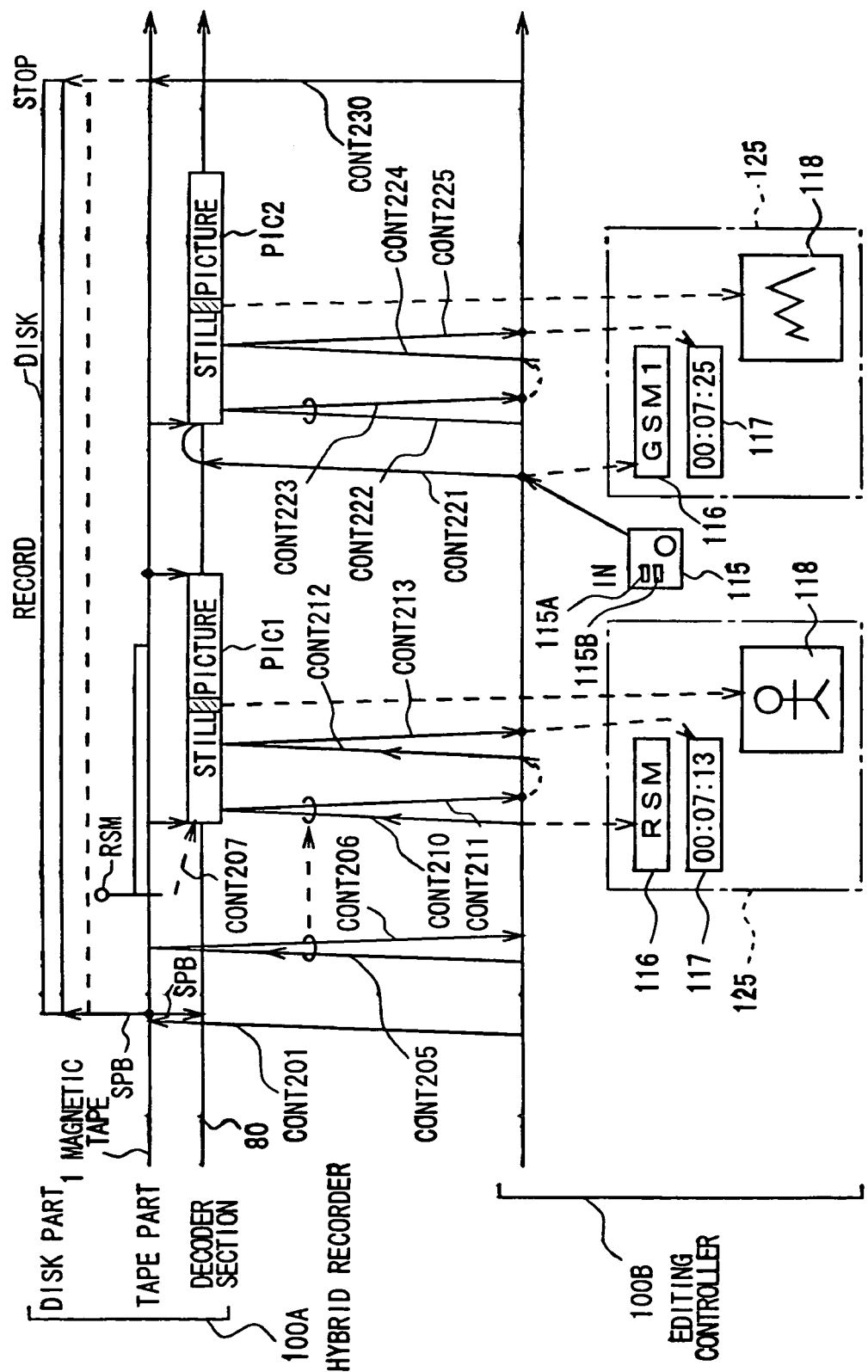
FIG. 16 is a schematic diagram serving for the description of marker detecting operation at the time of download.

Here, FIG. 16 shows the marker incorporating procedure in downloading the material data recorded on the magnetic tape 1 with the head position of the magnetic tape 1 onto the hard disk. When an editing operator manipulates the keyboard 122 or the mouse 121 of the editing controller 100B with the magnetic tape 1 loaded on the tape record/playback section 50 to specify the download, the system controller 114 of the editing controller 100B sends out the control signal CONT 201 representing the relevant specifying to the tape record/playback section 50 of the hybrid recorder 100A.

In response to the control signal CONT 201, the tape record/playback section 50 initiates the playback operation of the magnetic tape 1 and sends out a playback signal (video or audio signal) SPB to the disk record/playback section 70 and the decoder section 80. Thereby, the material data (video and audio signals) recorded on the magnetic tape 1 are successively recorded into the hard disk of the disk record playback section 70 as animated picture and the animated picture and voices in the course of recording are supplied to the decoder section 80 and decoded as well.

And, at the same time, by sending out a polling signal CONT 205 to the system controller 60 of the hybrid recorder 100A, the system controller 114 of the editing controller 100B checks whether a marker is detected from the magnetic tape 1 or not.

When a marker is detected while playing back the magnetic tape 1 in the marker detecting section 55, the tape record/playback section 50 stores the marker into the RAM 37A, marker data buffer. Thus, on receiving the polling signal CONT 205 from the editing controller 100B, the system controller 60 confirms the number of markers stored at this time in the RAM 37A and returns the result to the editing controller 100B as the response signal CONT 206.

At this time, since no marker is detected yet, the number of markers in the RAM 37A is "0" in the tape record/playback section 50. Thereby, without performing no marker-incorporating operation, the system controller 114 of the editing controller 100B sends out a polling signal CONT 210 to the tape record/playback section 50 again.

Here, on detecting a marker from the magnetic tape 1, the tape record/playback section 50 sends out a still picture control signal CONT 207 to the decoder section 80, so that in the decoder section 80 the playback image inputted at this time from the tape record/playback section 50 is fixed as still picture PIC1 and the time code (file time code) DT to be returned to the editing controller 100B is stopped in conformity to the value of the still picture.

When a marker detecting condition is confirmed in accordance with the polling signal CONT 210 in such a manner, the system controller 60 of the hybrid recorder 100A reads out the type of the marker from the RAM 37A at this time and returns this to the editing controller 100B over a response signal CONT 211 showing the marker detecting condition.

In accordance with the response signal CONT 211, the system controller 114 of the editing controller 100B checks the marker detecting condition and stores its marker type into the marker type store domain 116 of the memory 125.

And, to the system controller 60 of the hybrid recorder 100A, the system controller 114 sends out a request signal CONT 212 of the file time code corresponding to the marker detected at this time.

In answer to the request signal CONT 212, the system controller 60 returns the file time code DT to the editing controller 100B by means of a response signals CONT 213. Thereby, the system controller 114 of the editing controller 100B stores the file time code DT returned from the hybrid recorder 100A into the time code store domain 117 of the memory 125.

Besides, at the same time, the system controller 60 of the hybrid recorder 100A sends out the stamp picture corresponding to the marker preserved as still picture PIC1 in the decoder section 80 to the editing controller 100B to thus store it into the stamp picture store domain 118 of the memory 125. Thereby, in the memory 125 of the editing controller 100B, the marker information items (marker types, time codes and stamp pictures) recorded on the magnetic tape 1 are set.

Here, the editing controller 100B allows an editing operator himself to set a marker on the marker LOG file (in the memory 125) during the download of material data (video and audio signals) from the magnetic tape 1 to the hard disk. In this case, the system controller 114 of the editing controller 100B stores the marker type into the marker type store domain 116 of the memory 125 through the mark-in button 115A of the control section 115 of the editing controller 100B manipulated by an editing operator. In this embodiment, the marker set by manipulating the control section 115 is so preset as to be a shot mark GSM1. In this connection, the mark-out button 115B of the control section 115 can be manipulated to set a shot mark GSM2.

When the marker type is set at the marker type store domain 116 in this manner, the system controller 114 of the editing controller 100B sends out a still picture control signal CONT 221 to the hybrid recorder 100A.

On the basis of the still picture control signal CONT 221, the system controller 60 of the hybrid recorder 100A holds the image decoded at the decoder section 80 as a resting picture PIC2 and the time code DT conforming to the still picture PIC2 at this time as a file time code. And, by sending out a confirm signal CONT 222 to the system controller 60 of the hybrid recorder 100A, the system controller 114 of the editing controller 100B requests the check whether the decoder section 80 holds a still picture PIC2. On the check request, the system controller 60 returns a response signal CONT 223 representing the holding of the still picture PIC2 to the editing controller 100B, so that the system controller 114 of the editing controller 100B confirms that the still picture PIC2 is held.

Thereupon, by sending out a file time code request signal CONT 224 to the system controller 60 of the hybrid recorder 100A, the system controller 114 of the editing controller 100B stores the file time code returned in answer to the response signal CONT 225 into the time code store domain 117 of the memory 125.

Besides, at the same time, by sending out the still picture PIC2 held at this time in the decoder section 80 to the editing controller 100B as a stamp picture, the system controller 60 of the hybrid recorder 100A stores it into the stamp picture store domain 118 of the memory 125. Accordingly, in the memory 125 of the editing controller 100B, the marker information items (marker type, time code and stamp picture) anew set by an editing operator manipulating the control section 115 are set.

Thereupon, not only by holding the playback image in the course of processing at the decoder section 80 as a still picture according to the marker but also by holding the time code corresponding to the relevant still picture as a file time code, the occurrence of a lag between the stamp picture and the time code can be avoided even if the stamp pictures corresponding to markers and their file time codes are successively sent out from the hybrid recorder 100A to the editing controller 100B at respective different timings.

Figure 17:
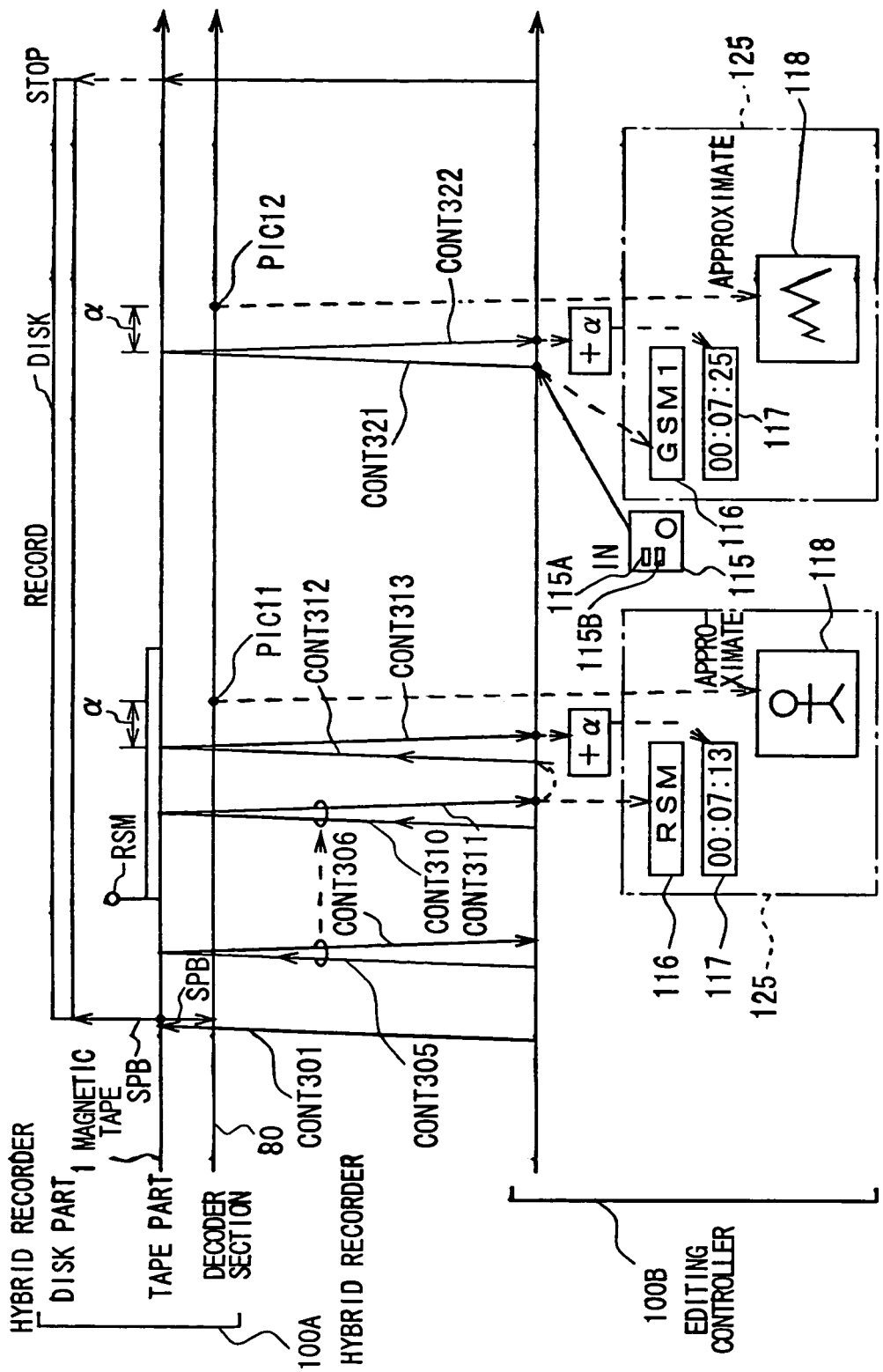
FIG. 17 is a schematic diagram serving for the description of marker detecting operation at the time of download.

Incidentally, with respect to the procedure of detecting a marker information item at the time of download mentioned above by referring to FIG. 16, it is arranged in case of detecting a marker to hold the playback image in the course of processing at the decoder section 80 as a still picture, but the present invention is not limited to this and it may be arranged to incorporate accurate marker information items (stamp picture and time code) into the memory 125 without holding a still picture, for example, as shown in FIG. 17.

Namely, FIG. 17 shows a procedure of incorporating a marker in downloading to the hard disk the material data recorded on the magnetic tape 1 from the head position of the magnetic tape 1. When an editing operator manipulates the keyboard 122 or the mouse 121 of the editing controller 100B to specify the download with the magnetic tape 1 loaded on the tape record/playback section 50, the system controller 114 of the editing controller 100B sends out a control signal CONT 301 representing the relevant specifying to the tape record/playback section 50 of the hybrid recorder 100A.

The tape record/playback section 50 initiates the playback operation of a magnetic tape 1 in answer to the relevant control signal CONT 301 and sends out a playback signal (video and audio signals) SPB to the disk record/playback section 70 and the decoder section 80. Thereby, the material data (video and audio signals) recorded on the magnetic tape 1 are successively recorded as animated pictures into the hard disk of the disk record/playback section 70 and the animated pictures and voices in the relevant course of recording are supplied to the decoder section 80 and decoded as well.

And, at the same time, by sending out a polling signal CONT 305 to the system controller 60 of the hybrid recorder 100A, the system controller 114 of the editing controller 100B checks whether a marker is detected from the magnetic tape 1.

On detecting a marker in the marker detecting section 55 while playing back the magnetic tape 1, the tape record/ playback section 50 stores the relevant marker into the RAM 37A, marker data buffer. Thus, on receiving the polling signal CONT 305 from the editing controller 100B, the system controller 60 checks the number of markers stored at this time in the RAM 37A and returns the result as a response signal CONT 306 to the editing controller 100B.

At this time, since no marker has yet been detected in the tape record/playback section 50, the number of markers in the RAM 37A is "0." Thereby, the system controller 114 of the editing controller 100B sends out a polling signal CONT 310 again to the tape record/playback section 50 without performing the marker-incorporating operation.

On checking the marker detecting condition with the polling signal CONT 310, the system controller 60 of the hybrid recorder 100A reads out the type of the marker at this time from the RAM 37A and returns this to the editing controller 100B over the response signal CONT 311 showing the marker detecting condition.

The system controller 114 of the editing controller 100B checks the marker detecting condition in accordance with the relevant response signal CONT 311 and stores the marker type into the marker type store domain 116 of the memory 125.

And, the system controller 114 sends out a request signal CONT 312 for a file time code to the system controller 60 of the hybrid recorder 100A.

In answer to the request signal CONT 312, the system controller 60 returns the time code DT according to the marker held at the time code data holding section 33 to the editing controller 100B over a response signal CONT 313. The system controller 114 of the editing controller 100B adds a correction value "+a" preset in conformity to the incorporating timing of the stamp picture to be incorporated later from the hybrid recorder 100A to the time code DT returned from the hybrid recorder 100A and stores this into the time code store domain 117 of the memory 125 as a file time code.

And, subsequently, the system controller 60 of the hybrid recorder 100A stores the image played back at this time from the tape record/playback section 50 into the stamp picture store domain 118 of the memory 125 by sending it out as a stamp picture to the editing controller 100B. The stamp picture stored thus in the stamp picture store domain 118 differs in the timing of being acquired from the hybrid recorder 100A from the time code DT stored in the time code store domain 117, but the corrected time code (file time code) DT stored in the time code store domain 117 becomes coincident with the time code of the stamp picture stored in the stamp picture store domain 118 because the system controller 114 corrects the time code DT in advance.

Meanwhile, the stamp picture incorporated into the stamp picture store domain 118 is a stamp picture at the timing delayed by the time needed for the process of incorporating the stamp picture from the detected timing of the marker RSM and the GUI 120 is so arranged as to notify an editing operator that the relevant stamp picture is a stamp picture slightly different in timing from the marker by indicating the characters of "approximate" as the stamp picture flag 236 of the GUI screen (FIG. 11).

Thus, on checking the relevant indication, an editing operator makes, for example, the marker search operation mentioned above by referring to FIG. 13 or an access to a specific marker, thereby enabling an accurate stamp picture to be incorporated.

Accordingly, at the memory 125 of editing controller 100B, the marker information items (marker type, time code and stamp picture) recorded on the magnetic tape 1 are set.

Here, the editing controller 100B allows an editing operator himself to set a marker on the marker LOG file (memory 125) during the download of material data (video and audio signals) from the magnetic tape 1 to the hard disk. In this case, the system controller 114 of the editing controller 100B stores the marker type into the marker type store domain 116 of the memory 125 through the mark-in button 115A of the control section 115 of the editing controller 100B manipulated by an editing operator. In this embodiment, the marker set by manipulating the mark-in button 115A of the control section 115 is so preset as to be a shot mark GSM1. In this connection, the mark-out button 115B of the control section 115 can be manipulated to set a shot mark GSM2.

When the marker type is set at the marker-type store domain 116 in this manner, the system controller 114 of the editing controller 100B sends out a request signal CONT 321 for a file time code to the hybrid recorder 100A.

In answer to the request signal CONT 321, the system controller 60 of the hybrid recorder 100A returns the time code DT held at the time code data holding section 33 to the editing controller 100B over a response signal CONT 322. The system controller 114 of the editing controller 100B adds a correction value "+a" preset in conformity to the incorporating timing of the stamp picture to be incorporated later from the hybrid recorder 100A to the time code DT returned from the hybrid recorder 100A and stores this into the time code store domain 117 of the memory 125 as a file time code.

And, subsequently, the system controller 60 of the hybrid recorder 100A stores the image played back at this time from the tape record/playback section 50 into the stamp picture store domain 118 of the memory 125 by sending it out as a stamp picture to the editing controller 100B. The stamp picture stored thus in the stamp picture store domain 118 differs in the timing of being acquired from the hybrid recorder 100A from the time code DT stored in the time code store domain 117, but the corrected time code (file time code) DT stored in the time code store domain 117 becomes coincident with the time code of the stamp picture stored in the stamp picture store domain 118 because the system controller 114 corrects the time code DT in advance.

Due to such a process, the system controller 114 stores the stamp picture approximated to a marker and the time code corrected in such a manner as to accurately coincide with that of the relevant stamp picture into the memory 125 even when the image in the course of processing at the decoder section 80 is not held as a still picture for every detection of a marker in the hybrid recorder 100A, thereby enabling them to be registered onto the marker LOG file.

Figure 18:
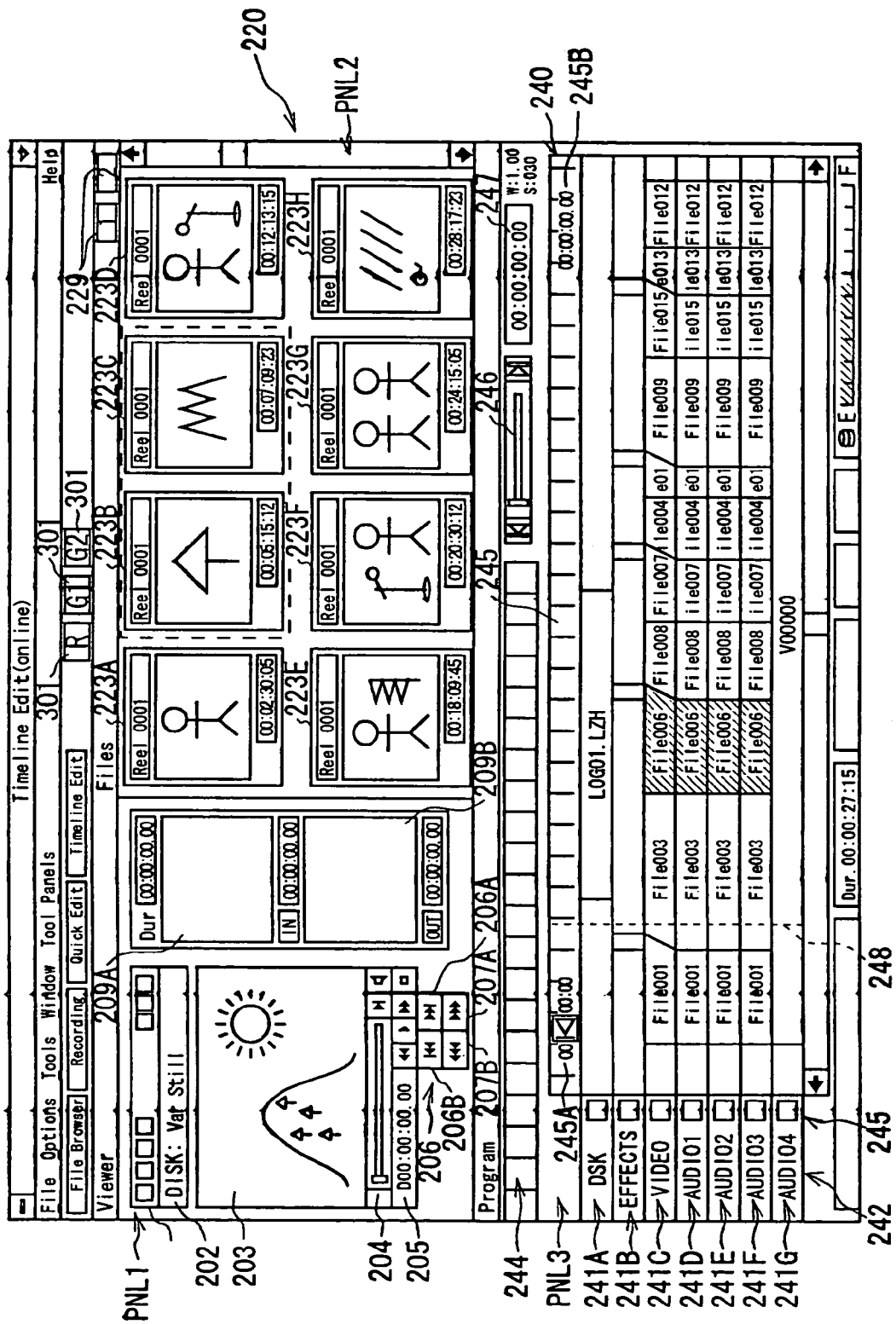
FIG. 18 is a schematic diagram showing a GUI screen.

When the registration of information items (marker types, time codes and stamp pictures) about individual markers onto the marker LOG file (memory 125) is completed like this, the GUI 120 displays such a GUI screen as shown in FIG. 18 on a monitor.

In this case, the GUI 120 displays stamp pictures of individual markers at the stamp picture display screen part 220 of the GUI screen. The GUI 120 displays the marker display select buttons 301, 302 and 303 on the GUI screen. When an editing operator clicks any of these buttons, the GUI 120 displays only the stamp pictures (marker information display part) of the markers corresponding to the clicked button. For example, if an editing operator clicks the marker display select button 301 specifying the record start mark RSM, the GUI 120 displays only the stamp pictures (marker information display part) of the record start mark RSM in the stamp picture display screen part 220, whereas the GUI 120 displays only the stamp pictures (marker information display part) of the shot mark GSM1 in the stamp picture display screen part 220 if an editing operator clicks the marker display select button 302 specifying the shot mark GSM1 or the GUI 120 displays only the stamp pictures (marker information display part) of the shot mark GSM2 in the stamp picture display screen part 220 if an editing operator clicks the marker display select button 303 specifying the shot mark GSM2.

Like this, with stamp pictures (marker information display part) displayed at the stamp picture display screen part 22D, an editing operator clicks any of these pictures, thereby enabling the system controller 114 to cue up the magnetic tape 1 or the hard disk at the position of the clicked stamp picture. In this case, the cued up image is displayed at the video window 203 of the Viewer panel PNL1.

Besides, when an editing operator selects two stamp pictures among those of the stamp picture display screen part 220, the system controller 114 can set up the material data between the markers corresponding to these selected two stamp pictures on the time line as edit material data. In FIG. 18, for example, when an editing operator selects the marker information display parts 223B and 223C and specifies a desired position on the time line as well, the system controller 114 can set up the material data between these two markers on the relevant time line as edit material data.

Figure 19:
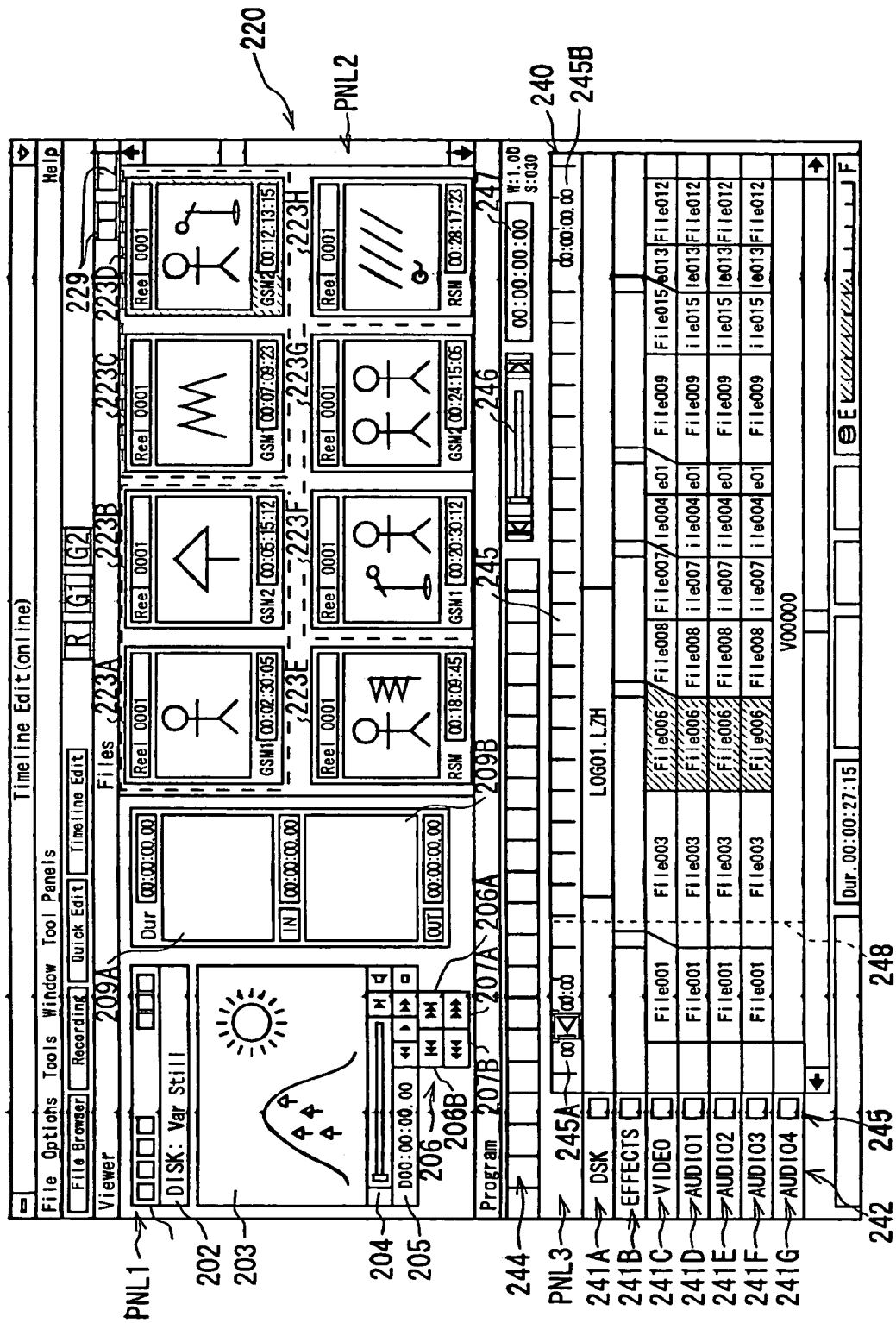
FIG. 19 is a schematic diagram showing a GUI screen.

Besides, with stamp pictures of multiple markers displayed at the stamp picture display screen part 220 of the GUI screen, as shown in FIG. 19, the system controller 114 displays the neighboring shot marks GSM1 and GSM2 of the stamp picture display screen part 220 as one group and these resultant groups can be set up respectively as one set of edit material data at desired positions on the time line by the manipulation of an editing operator.

Figure 20:
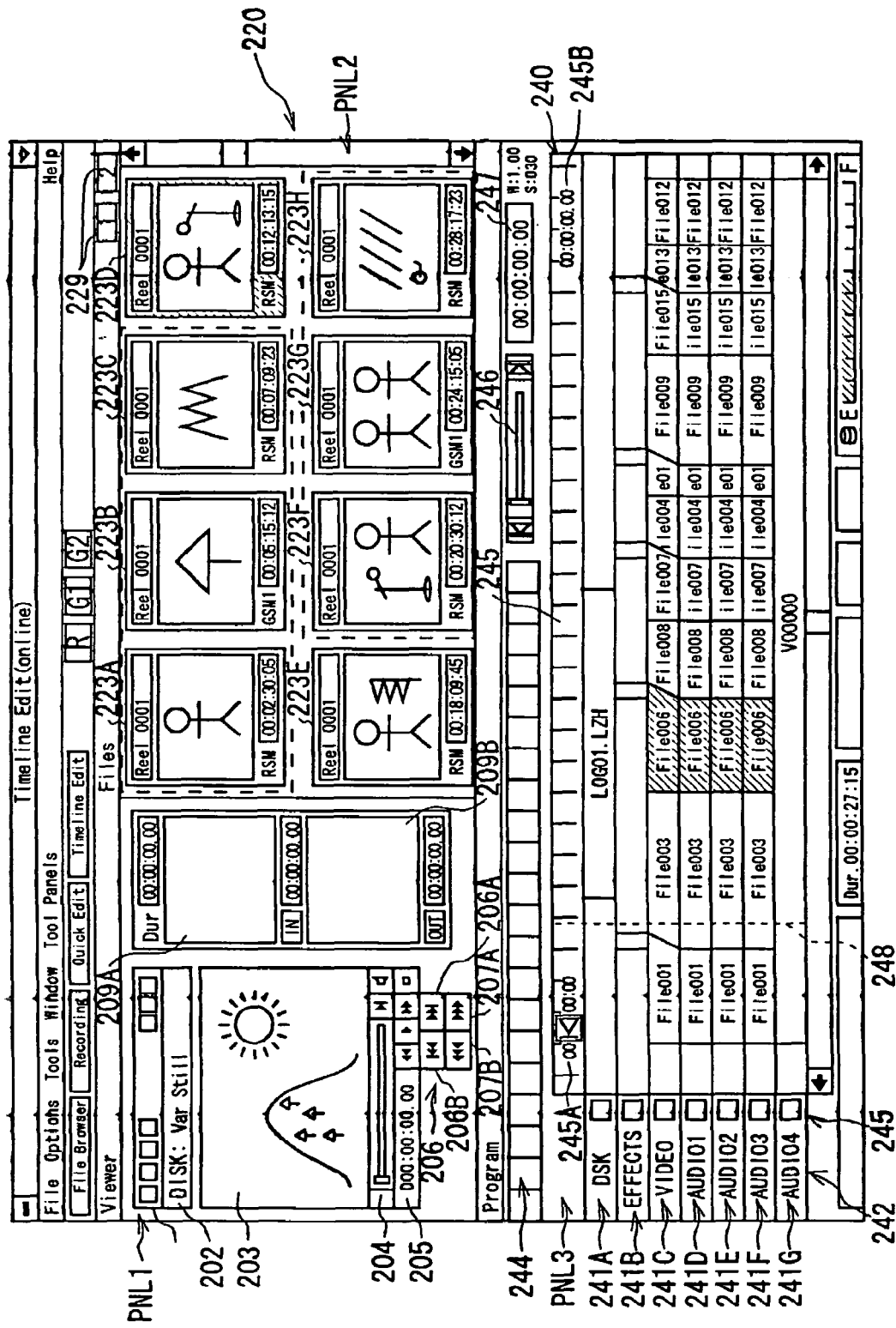
FIG. 20 is a schematic diagram showing a GUI screen.

Besides, with stamp pictures of multiple markers displayed at the stamp picture display screen part 220 of the GUI screen, as shown in FIG. 20, the system controller 114 displays two record start marks RSMs sandwiching a shot mark GSM1 or GSM2 of the stamp picture display screen part 220 as one group and these resultant-groups can be set up respectively as one set of edit material data at desired positions on the time line by the manipulation of an editing operator. Thereby, the range with a shot mark GSM1 or GSM2 put between the record start marks RSMs can be set up as edit material data (event).

(5) Operation and Effect of the Embodiment

In the above arrangement, when an editing operator manipulates the keyboard 122 or the mouse 121 to input an instruction of searching or scanning a marker recorded on the magnetic tape 1 of the tape record/playback section 50 of the hybrid recorder 100A while viewing the GUI screen displayed on the display screen of a monitor, the system controller 114 of the editing controller 100B sends out the search or scan instruction to the hybrid recorder 100A.

In answer to the relevant instruction, the system controller 60 of the hybrid recorder 100A fast searches the magnetic tape 1 loaded on the tape record/playback section 50 from the head.

In this fast search, the tape record/playback section 50 keeps detecting a marker at the marker detecting section 55 and incorporating it into the RAM 37A while successively searching markers recorded in advance on the magnetic tape 1. And, the system controller 60 sends out the incorporated markers to the editing controller 100B at a given timing and stores them into the memory 125. The marker information items stored in this memory 125 are registered onto the marker LOG file.

When the markers on the magnetic tape 1 are registered onto the memory 125 (marker LOG file) in this manner, an editing operator can make an edit list on the time line (FIG. 6) by using information items (marker types, time codes and stamp pictures) about the markers registered on the marker LOG file.

Namely, while viewing the stamp pictures of the registered markers or the marker information review of the marker LOG file displayed on the GUI screen, an editing operator matches a cursor with and clicks any of them to thereby specify the IN and OUT points of the necessary scene. When the IN and OUT points are specified in this manner, the material data sandwiched between them are set up as edit material data and registered at a point on the time line specified by the editing operator. During this edit list playback operation, no access to the material data on the magnetic tape 1 is made.

Thus, by reading out a marker and the information items about the marker from a magnetic tape 1 once and registering them onto the marker LOG file, an edit list can be easily made out without reading out material data on the magnetic tape 1 every time when preparing a record list or an edit list on the time line.

When an edit list on the time line is made out by an editing operator in this manner, the system controller 114 executes the download according to the edit list made out at this time on the time line according to the manipulation of the editing operator, so that the edit material data needed for the edit on the magnetic tape 1 are recorded onto the hard disk.

Due to such a process, prepared on the hard disk are the edited data according to the record list made out by an editing operator using the marker-LOG file or the edit list on the time line According to the above arrangement, the information items (marker types, time codes and stamp pictures) about the markers registered on a marker LOG file are displayed on the GUI screen with markers searched from the magnetic tape 1 and registered onto the marker LOG file and an edit list on the time line is made out by using the displayed information items, so that an editing operator can easily perform the editing operation on the GUI screen without making an access to material data on the magnetic tape 1 in the editing operation for making out the relevant edit list.

Besides, in the above arrangement, when an editing operator manipulates the keyboard 122 and the mouse 121 to input an instruction of searching the markers recorded on the magnetic tape 1 of the tape record/playback section 50 of the hybrid recorder 100A while viewing the GUI screen displayed on the display screen of a monitor, the system controller 114 of the editing controller 100B sends out the relevant search instruction to the hybrid recorder 100A.

In answer to the search instruction, the system controller 60 of the hybrid recorder 100A fast searches the magnetic tape 1 loaded on the tape record/playback section 50 from the head.

In this fast search, the tape record/playback section 50 detects and incorporates markers at the marker detecting section 55 and into the RAM 37A while successively searching markers recorded on the magnetic tape 1 in advance. And, the system controller 60 sends out the incorporated markers to the editing controller 100B at a given timing and stores them into the memory 125. The marker information items stored in this memory 125 are registered onto the marker LOG file.

In such a fast search, the higher the search speed, the greater the deviation of the time code of the marker to be read out from the corresponding stamp picture. At a higher search speed than 20-fold speed, for example, since the readout of stamp pictures becomes difficult, only marker type information items and time codes are stored into the memory 125.

If a stamp picture became a situation of not coinciding with its time code (approximate condition) or a situation of not incorporated condition, the system controller 114 makes an accurate access to individual markers according to a search operation specified by an editing operator. Thereby, even on the occasion of a situation that an approximate stamp picture was incorporated or no stamp was incorporated at a fast search, an accurate access implemented later enables the system controller 114 to register the time code and the stamp picture of the relevant marker onto the marker LOG file in the coincident situation.

Accordingly, using a marker LOG file with accurate stamp pictures and time codes registered, an accurate editing operation can be carried out.

Besides, in the above arrangement, when an editing operator manipulates the keyboard 122 or the mouse 121 to input an instruction of searching or scanning the markers recorded on the magnetic tape 1 of the tape record/playback section 50 of the hybrid recorder 100A while viewing the GUI screen displayed on the display screen of a monitor the system controller 114 of the editing controller 100B sends out an instruction of the relevant search or scan to the hybrid recorder 100A.

In answer to the relevant instruction, the system controller 60 of the hybrid recorder 100A fast searches the magnetic tape 1 loaded on the tape record/playback section 50 from the head.

In this fast search, the tape record/playback section 50 detects and incorporates markers at the marker detecting section 55 and into the RAM 37A while successively searching markers recorded on the magnetic tape 1 in advance. And, the system controller 60 sends out the incorporated markers to the editing controller 100B at a given timing and stores them into the memory 125. The marker information items stored in this memory 125 are registered onto a marker LOG file.

When markers on the magnetic tape 1 are registered onto the memory 125 (marker LOG file) in this manner, an editing operator can use the information items (marker types, time codes and stamp pictures) about the markers registered on the relevant marker LOG file to register an edit material data file at the record list review display section 260 (FIG. 14) and to make out an edit list on the time line (FIG. 6).

Thus, by reading out a marker and the information items about the marker once from the magnetic tape 1 and registering them onto a marker LOG file in this manner, an edit list can be easily made out without reading out material data on the magnetic tape 1 every time in making out a record list or an edit list on the time line.

When a record list or an edit list on the time line is made out by an editing operator in this manner, the system controller 114 executes the download according to the record list made out at this time or the edit list on the time line according to the manipulation of the editing operator, so that the edit material data needed for the editing on the magnetic tape 1 are recorded onto the hard disk.

Due to such a process, on the hard disk are prepared edited data according to a record list or an edit list on the time line, made out by the editing operator with the aid of the marker LOG file.

According to the above arrangement, using the information items (marker types, time codes and stamp pictures) about the markers registered on the relevant marker LOG file with markers searched from the magnetic tape 1 and registered onto a marker LOG file, a record list or an edit list on the time line is made out, so that an editing operator can complete the editing operation without making an access to material data on the magnetic tape 1 in the editing operation for making out the relevant edit list. Accordingly, the editing operation can be easier carried out.

Besides, in the above arrangements, when an editing operator manipulates the keyboard 122 or the mouse 121 to input an instruction of searching or scanning the markers recorded on the magnetic tape 1 or fast playing back the material data of the magnetic tape 1 in the tape record/playback section 50 of the hybrid recorder 100A while viewing the GUI screen displayed on the display screen of a monitor, the system controller 114 of the editing controller 100B sends out an instruction of the relevant search or scan or fast playback to the hybrid recorder 100A.

In answer to the relevant instruction, the system controller 60 of the hybrid recorder 100A fast searches or fast plays back the magnetic tape 1 loaded on the tape record/playback section 50 from the head.

In this fast search or fast playback, the tape record/playback section 50 detects and incorporates markers at the marker detecting section 55 and into the RAM 37A while successively searching markers recorded on the magnetic tape 1 in advance. And, the system controller 60 sends out the incorporated markers to the editing controller 100B at a given timing and stores them into the memory 125. The marker information item stored in this memory 125 are registered onto a marker LOG file.

In this case, the system controller 60 reads out the time code at the detected time of the relevant marker as marker information item and holds the image in the course of processing at the decoder section 80 as a still picture according to the detection of the marker.

And, the system controller 60 sends out the time code read out according to the marker to the editing controller 100B to store it into the time code store domain 117 of the memory 125 and sends out the still picture held at the decoder section 80, corresponding to the marker, to the editing controller 100B to store this into the stamp picture store domain 118 of the memory 125.

Thereby, stored in the memory 125 (i.e., marker LOG file) are the time code corresponding to the marker (RSM, GSM1 or GSM2) detected from the magnetic tape 1 and the stamp picture coincident with the relevant time code.

Thus, the time code and the stamp picture of a marker registered on the marker LOG file become coincident and the editing operation can be accurately carried out.

According to the above arrangements, on detecting a marker on a magnetic tape 1, the time code corresponding to the marker is read out and the image in the course of processing (i.e., in the course of playback from the magnetic tape 1) at the decoder section 80 is held as a still picture, so that the stamp picture corresponding to the marker can be made coincident with the time code read out according to the marker.

According to the arrangement like this, the operation of making out an edit list can be made accurate and easy.

According to this embodiment, as mentioned above, markers recorded on a tape-shaped recording medium are detected by a fast access to the tape-shaped recording medium, the material data corresponding to the detected markers are registered onto a given file, the material data registered on the file are displayed and an edit list of material data is made out using the displayed material data, so that an edit list can be easily made out using material data registered on the file without making an access to material data of the tape-shaped recording medium in the editing operation for making out an edit list.

According to the arrangement like this, the editing operation can be made easier.

Besides, according to this embodiment, when a fast access to a tape-shaped recording medium is made to detect markers recorded on the tape-shaped recording medium and a marker is detected through the fast access, the material data at a position approximate to the recorded one of the marker are incorporated into given storage means by the readout of material data from the tape-shaped recording medium corresponding to the detection of the relevant marker, an access to the tape-shaped recording medium is made at a lower access speed than that of the fast access and material data at the position coincident with the recorded one of the marker are read out and replaced with the approximate material data incorporated into the storage means, so that the approximate material data incorporated by the fast access can be replaced with those accurately conforming with the marker, thereby enabling the editing operation using accurate material data to be performed.

Besides, according to this embodiment, a marker recorded on a tape-shaped recording medium is detected by a fast access to the tape-shaped recording medium, the detected marker is registered onto a given file, an edit list of material data is made out using the markers registered on the file and necessary data are read out from among the material data on the basis of the edit list made out so as to prepare the edited data, so that an edit list can be easily made out without making an access to the material data of the tape-shaped recording medium in the operation of making out an edit list.

According to the arrangement like this, the editing operation can be made easier.

Besides, according to this embodiment, a marker recorded on a tape-shaped recording medium is detected by a fast playback of the tape-shaped recording medium, the time code according to the relevant marker is stored and the material data played back from the tape-shaped recording medium are held when the marker is detected, the material data and time code held according to the detected marker are registered onto a given file, an edit list of material data on the tape-shaped recording medium is made out using the material data and time codes registered on the file, so that material data and time codes on the file can be conformed to each other in relation to markers.

According to the arrangement like this, the editing operation can be made more accurate and easier.

INDUSTRIAL APPLICABILITY

In an editing apparatus and editing method, the present invention is applicable to a case of editing material data recorded on a tape-shaped recording medium and like cases.

What is claimed is:

1. An editing apparatus for editing material data recorded on a tape-shaped recording medium, comprising:
   fast access means for detecting a marker and a corresponding stamp picture recorded on said tape-shaped recording medium by a fast access to said tape-shaped recording medium,
      wherein a plurality of said markers is recorded on said tape-shaped medium for a specified instant, each marker includes time data, frame data, and an incremented data serial number code and is recorded for a specified number of frames;
   data registering means for registering said material data and the corresponding stamp pictures, read out from said tape-shaped recording medium according to a detection of said marker and the corresponding stamp pictures by said fast access means, onto a particular file;
   data display means for displaying said material data and the stamp pictures registered on said particular file; and
   edit list making means for generating an edit list of said material data by using said material data displayed on said data display means.

2. The editing apparatus as set forth in claim 1, characterized in that said material data are image data.

3. The editing apparatus as set forth in claim 1, characterized in that said data display means displays the edit list defined with the material data specified by a given input manipulation from among said displayed material data at the position specified by said given input manipulation on the time axis.

4. An editing method for editing material data recorded on a tape-shaped recording medium, comprising the steps of:
   detecting a marker and a corresponding stamp picture recorded on said tape-shaped recording medium by a fast access to said tape-shaped recording medium,
      wherein a plurality of said markers is recorded on said tape-shaped medium for a specified instant, each marker includes time data, frame data, and an incremented data serial number code;
   registering said material data and the corresponding stamp pictures, read out from said tape-shaped recording medium according to the detection of said marker and the corresponding stamp pictures, onto a given file;
   displaying said material data and the stamp pictures registered on said given file; and
   generating an edit list of said material data by using said material data displayed.

5. The editing method as set forth in claim 4, characterized in that said material data are image data.

6. The editing method as set forth in claim 4, characterized in that the step of displaying said material data is a step in which the edit point defined with the material data specified by a given input manipulation from among said displayed material data is displayed at the position specified by said input manipulation on the time axis.

* * * * *